United States Patent
Noeth et al.

(10) Patent No.: US 10,349,209 B1
(45) Date of Patent: Jul. 9, 2019

(54) LOCATION-BASED MESSAGING

(71) Applicant: Investment Asset Holdings LLC, Palo Alto, CA (US)

(72) Inventors: Eric Noeth, San Francisco, CA (US); Zachary DeWitt, San Francisco, CA (US); Matthew Diepenbrock, San Jose, CA (US)

(73) Assignee: Investment Asset Holdings LLC, Palo Alto, CA (US)

( * ) Notice: Subject to any disclaimer, the term of this patent is extended or adjusted under 35 U.S.C. 154(b) by 0 days.

(21) Appl. No.: 16/105,687

(22) Filed: Aug. 20, 2018

Related U.S. Application Data

(63) Continuation of application No. 15/835,100, filed on Dec. 7, 2017, now Pat. No. 10,080,102, which is a
(Continued)

(51) Int. Cl.
*H04W 4/021* (2018.01)
*H04L 29/08* (2006.01)
(Continued)

(52) U.S. Cl.
CPC ............ *H04W 4/021* (2013.01); *H04L 51/24* (2013.01); *H04L 67/10* (2013.01); *H04M 1/72572* (2013.01); *H04W 4/12* (2013.01)

(58) Field of Classification Search
CPC ......... H04W 4/021; H04W 8/18; H04W 4/14; H04W 4/12; H04M 1/72552; H04M 1/72572; H04L 51/24; H04L 67/10
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| CN | 107637099 A | 1/2018 |

(Continued)

OTHER PUBLICATIONS

"A Whole New Story", Snap, Inc., URL: https://www.snap.com/en-US/news/, (2017), 13 pgs.
(Continued)

*Primary Examiner* — Leon Flores
(74) *Attorney, Agent, or Firm* — Schwegman Lundberg & Woessner, P.A.

(57) ABSTRACT

Systems and methods are described for location based messaging. In one embodiment a mobile device is configured to receive a first recipient selection input identifying a second mobile device, a first content message associated with the first recipient selection input, and a first geofence input associated with the first content message, wherein the first geofence input identifies a first delivery area. The mobile device then initiates communication of the first content message from the mobile device to the second mobile device via a network, wherein the first content message is configured for presentation on the second mobile device when the second mobile device is within the first delivery area.

19 Claims, 21 Drawing Sheets

Related U.S. Application Data continuation of application No. 15/486,111, filed on Apr. 12, 2017, now Pat. No. 9,866,999, which is a continuation of application No. 14/594,410, filed on Jan. 12, 2015, now Pat. No. 9,628,950.

(60) Provisional application No. 61/926,324, filed on Jan. 12, 2014.

(51) Int. Cl.
*H04L 12/58* (2006.01)
*H04W 4/12* (2009.01)
*H04M 1/725* (2006.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel Doron Ben et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,369,866 B2 * | 2/2013 | Ashley, Jr. ............. H04W 4/02 340/10.1 |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |

(56) References Cited

U.S. PATENT DOCUMENTS

| | | |
|---|---|---|
| 8,472,935 B1 | 6/2013 | Fujisaki |
| 8,494,481 B1* | 7/2013 | Bacco .................. G08B 25/005 |
| | | 455/404.1 |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1* | 8/2014 | Wang .................... H04W 4/021 |
| | | 455/456.3 |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1* | 10/2015 | Campbell ................. G06F 9/54 |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,672,538 B1* | 6/2017 | Vaynblat ............ G06Q 30/0261 |
| 9,674,660 B1* | 6/2017 | Vaynblat ............ G06Q 30/0261 |
| 9,710,821 B2 | 7/2017 | Heath |
| 9,802,121 B2* | 10/2017 | Ackley .................. A63F 13/216 |
| 9,843,720 B1 | 12/2017 | Ebsen et al. |
| 9,854,219 B2 | 12/2017 | Sehn |
| 9,866,999 B1* | 1/2018 | Noeth .................. H04M 1/72552 |
| 10,080,102 B1 | 9/2018 | Noeth et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0098850 A1* | 7/2002 | Akhteruzzaman ...... H04W 4/02 |
| | | 455/456.5 |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1* | 1/2003 | Cao ....................... G01C 21/20 |
| | | 340/686.6 |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0185877 A1* | 9/2004 | Asthana ................. G06Q 30/02 |
| | | 455/456.6 |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102180 A1 | 5/2005 | Gailey et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1* | 8/2007 | Buron ................. G06F 17/3087 |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |

(56) References Cited

U.S. PATENT DOCUMENTS

| | | | |
|---|---|---|---|
| 2007/0268988 A1* | 11/2007 | Hedayat | H04B 7/0851 375/347 |
| 2007/0281690 A1 | 12/2007 | Altman et al. | |
| 2008/0012987 A1 | 1/2008 | Hirata et al. | |
| 2008/0022329 A1 | 1/2008 | Glad | |
| 2008/0025701 A1 | 1/2008 | Ikeda | |
| 2008/0032703 A1 | 2/2008 | Krumm et al. | |
| 2008/0033930 A1 | 2/2008 | Warren | |
| 2008/0043041 A2 | 2/2008 | Hedenstroem et al. | |
| 2008/0049704 A1 | 2/2008 | Witteman et al. | |
| 2008/0062141 A1 | 3/2008 | Chandhri | |
| 2008/0076505 A1 | 3/2008 | Ngyen et al. | |
| 2008/0092233 A1 | 4/2008 | Tian et al. | |
| 2008/0094387 A1 | 4/2008 | Chen | |
| 2008/0104503 A1 | 5/2008 | Beall et al. | |
| 2008/0109844 A1 | 5/2008 | Baldeschwieler et al. | |
| 2008/0120409 A1 | 5/2008 | Sun et al. | |
| 2008/0147730 A1 | 6/2008 | Lee et al. | |
| 2008/0148150 A1 | 6/2008 | Mall | |
| 2008/0158230 A1 | 7/2008 | Sharma et al. | |
| 2008/0168033 A1 | 7/2008 | Ott et al. | |
| 2008/0168489 A1 | 7/2008 | Schraga | |
| 2008/0189177 A1 | 8/2008 | Anderton et al. | |
| 2008/0207176 A1 | 8/2008 | Brackbill et al. | |
| 2008/0208692 A1 | 8/2008 | Garaventi et al. | |
| 2008/0214210 A1 | 9/2008 | Rasanen et al. | |
| 2008/0222545 A1 | 9/2008 | Lemay | |
| 2008/0255976 A1 | 10/2008 | Altberg et al. | |
| 2008/0256446 A1 | 10/2008 | Yamamoto | |
| 2008/0256577 A1 | 10/2008 | Funaki et al. | |
| 2008/0266421 A1 | 10/2008 | Takahata et al. | |
| 2008/0270938 A1 | 10/2008 | Carlson | |
| 2008/0284587 A1* | 11/2008 | Saigh | H04M 1/72541 340/539.13 |
| 2008/0288338 A1 | 11/2008 | Wiseman et al. | |
| 2008/0306826 A1 | 12/2008 | Kramer et al. | |
| 2008/0313329 A1 | 12/2008 | Wang et al. | |
| 2008/0313346 A1 | 12/2008 | Kujawa et al. | |
| 2008/0318616 A1 | 12/2008 | Chipalkatti et al. | |
| 2009/0006191 A1 | 1/2009 | Arankalle et al. | |
| 2009/0006565 A1 | 1/2009 | Velusamy et al. | |
| 2009/0015703 A1 | 1/2009 | Kim et al. | |
| 2009/0024956 A1 | 1/2009 | Kobayashi | |
| 2009/0030774 A1 | 1/2009 | Rothschild et al. | |
| 2009/0030999 A1 | 1/2009 | Gatzke et al. | |
| 2009/0040324 A1 | 2/2009 | Nonaka | |
| 2009/0042588 A1 | 2/2009 | Lottin et al. | |
| 2009/0058822 A1 | 3/2009 | Chaudhri | |
| 2009/0079846 A1 | 3/2009 | Chou | |
| 2009/0089678 A1 | 4/2009 | Sacco et al. | |
| 2009/0089710 A1 | 4/2009 | Wood et al. | |
| 2009/0093261 A1 | 4/2009 | Ziskind | |
| 2009/0132341 A1 | 5/2009 | Klinger | |
| 2009/0132453 A1 | 5/2009 | Hangartner et al. | |
| 2009/0132665 A1 | 5/2009 | Thomsen et al. | |
| 2009/0148045 A1 | 6/2009 | Lee et al. | |
| 2009/0153492 A1 | 6/2009 | Popp | |
| 2009/0157450 A1 | 6/2009 | Athsani et al. | |
| 2009/0157752 A1 | 6/2009 | Gonzalez | |
| 2009/0160970 A1 | 6/2009 | Fredlund et al. | |
| 2009/0163182 A1 | 6/2009 | Gatti et al. | |
| 2009/0177299 A1 | 7/2009 | Van De Sluis | |
| 2009/0177588 A1 | 7/2009 | Marchese | |
| 2009/0177730 A1* | 7/2009 | Annamalai | H04W 4/02 709/202 |
| 2009/0192900 A1 | 7/2009 | Collision | |
| 2009/0199242 A1 | 8/2009 | Johnson et al. | |
| 2009/0215469 A1 | 8/2009 | Fisher et al. | |
| 2009/0232354 A1 | 9/2009 | Camp, Jr. et al. | |
| 2009/0234815 A1 | 9/2009 | Boerries et al. | |
| 2009/0239552 A1 | 9/2009 | Churchill et al. | |
| 2009/0249222 A1 | 10/2009 | Schmidt et al. | |
| 2009/0249244 A1 | 10/2009 | Robinson et al. | |
| 2009/0265647 A1 | 10/2009 | Martin et al. | |
| 2009/0288022 A1 | 11/2009 | Almstrand et al. | |
| 2009/0291672 A1 | 11/2009 | Treves et al. | |
| 2009/0292608 A1 | 11/2009 | Polachek | |
| 2009/0319607 A1 | 12/2009 | Belz et al. | |
| 2009/0327073 A1 | 12/2009 | Li | |
| 2010/0041378 A1* | 2/2010 | Aceves | H04W 8/18 455/414.1 |
| 2010/0062794 A1 | 3/2010 | Han | |
| 2010/0082427 A1 | 4/2010 | Burgener et al. | |
| 2010/0082693 A1 | 4/2010 | Hugg et al. | |
| 2010/0100568 A1 | 4/2010 | Papin et al. | |
| 2010/0113065 A1 | 5/2010 | Narayan et al. | |
| 2010/0130233 A1 | 5/2010 | Lansing | |
| 2010/0131880 A1 | 5/2010 | Lee et al. | |
| 2010/0131895 A1 | 5/2010 | Wohlert | |
| 2010/0153144 A1 | 6/2010 | Miller et al. | |
| 2010/0159944 A1 | 6/2010 | Pascal et al. | |
| 2010/0161658 A1 | 6/2010 | Hamynen et al. | |
| 2010/0161831 A1 | 6/2010 | Haas et al. | |
| 2010/0162149 A1 | 6/2010 | Sheleheda et al. | |
| 2010/0183280 A1 | 7/2010 | Beauregard et al. | |
| 2010/0185552 A1 | 7/2010 | Deluca et al. | |
| 2010/0185665 A1 | 7/2010 | Horn et al. | |
| 2010/0191631 A1 | 7/2010 | Weidmann | |
| 2010/0197318 A1 | 8/2010 | Petersen et al. | |
| 2010/0197319 A1 | 8/2010 | Petersen et al. | |
| 2010/0198683 A1 | 8/2010 | Aarabi | |
| 2010/0198694 A1 | 8/2010 | Muthukrishnan | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2010/0201482 A1 | 8/2010 | Robertson et al. | |
| 2010/0201536 A1 | 8/2010 | Robertson et al. | |
| 2010/0214436 A1 | 8/2010 | Kim et al. | |
| 2010/0223128 A1 | 9/2010 | Dukellis et al. | |
| 2010/0223343 A1 | 9/2010 | Bosan et al. | |
| 2010/0250109 A1 | 9/2010 | Johnston et al. | |
| 2010/0257196 A1 | 10/2010 | Waters et al. | |
| 2010/0259386 A1 | 10/2010 | Holley et al. | |
| 2010/0273509 A1 | 10/2010 | Sweeney et al. | |
| 2010/0281045 A1 | 11/2010 | Dean | |
| 2010/0306669 A1 | 12/2010 | Della Pasqua | |
| 2011/0004071 A1 | 1/2011 | Faiola et al. | |
| 2011/0010205 A1 | 1/2011 | Richards | |
| 2011/0029512 A1 | 2/2011 | Folgner et al. | |
| 2011/0040783 A1 | 2/2011 | Uemichi et al. | |
| 2011/0040804 A1 | 2/2011 | Peirce et al. | |
| 2011/0050909 A1 | 3/2011 | Ellenby et al. | |
| 2011/0050915 A1 | 3/2011 | Wang et al. | |
| 2011/0064388 A1 | 3/2011 | Brown et al. | |
| 2011/0066743 A1 | 3/2011 | Hurley et al. | |
| 2011/0083101 A1 | 4/2011 | Sharon et al. | |
| 2011/0102630 A1 | 5/2011 | Rukes | |
| 2011/0119133 A1 | 5/2011 | Igelman et al. | |
| 2011/0131633 A1 | 6/2011 | Macaskill et al. | |
| 2011/0137881 A1 | 6/2011 | Cheng et al. | |
| 2011/0145564 A1 | 6/2011 | Moshir et al. | |
| 2011/0159890 A1 | 6/2011 | Fortescue et al. | |
| 2011/0164163 A1 | 7/2011 | Bilbrey et al. | |
| 2011/0197194 A1 | 8/2011 | D'Angelo et al. | |
| 2011/0202598 A1 | 8/2011 | Evans et al. | |
| 2011/0202968 A1 | 8/2011 | Nurmi | |
| 2011/0211534 A1 | 9/2011 | Schmidt et al. | |
| 2011/0213845 A1 | 9/2011 | Logan et al. | |
| 2011/0215966 A1 | 9/2011 | Kim et al. | |
| 2011/0225048 A1 | 9/2011 | Nair | |
| 2011/0238300 A1 | 9/2011 | Schenken | |
| 2011/0238763 A1 | 9/2011 | Shin et al. | |
| 2011/0255736 A1 | 10/2011 | Thompson et al. | |
| 2011/0256881 A1 | 10/2011 | Huang et al. | |
| 2011/0273575 A1 | 11/2011 | Lee | |
| 2011/0282799 A1 | 11/2011 | Huston | |
| 2011/0283188 A1 | 11/2011 | Farrenkopf | |
| 2011/0294541 A1* | 12/2011 | Zheng | G08B 3/10 455/556.1 |
| 2011/0314419 A1 | 12/2011 | Dunn et al. | |
| 2011/0320373 A1 | 12/2011 | Lee et al. | |
| 2012/0150978 A1 | 1/2012 | Monaco | |

(56) References Cited

U.S. PATENT DOCUMENTS

| | | |
|---|---|---|
| 2012/0028659 A1 | 2/2012 | Whitney et al. |
| 2012/0033718 A1* | 2/2012 | Kauffman ............ H04B 1/3822 |
| | | 375/222 |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0208564 A1 | 8/2012 | Clark et al. |
| 2012/0209924 A1 | 8/2012 | Evans et al. |
| 2012/0210244 A1 | 8/2012 | Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1* | 12/2012 | Lee ........................ H01Q 1/38 |
| | | 343/700 MS |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0115872 A1* | 5/2013 | Huang ..................... H04W 4/02 |
| | | 455/3.01 |
| 2013/0122862 A1* | 5/2013 | Horn ....................... H04W 8/20 |
| | | 455/411 |
| 2013/0122929 A1* | 5/2013 | Al-Mufti ................ H04W 24/00 |
| | | 455/456.1 |
| 2013/0128059 A1 | 5/2013 | Kristensson |
| 2013/0129252 A1 | 5/2013 | Lauper |
| 2013/0132194 A1 | 5/2013 | Rajaram |
| 2013/0132477 A1 | 5/2013 | Bosworth et al. |
| 2013/0145286 A1 | 6/2013 | Feng et al. |
| 2013/0157684 A1 | 6/2013 | Moser |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1* | 2/2014 | Basnayake ............ H01Q 1/3275 |
| | | 343/872 |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1* | 4/2014 | Aziz ..................... G06Q 10/063 |
| | | 701/425 |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0164118 A1 | 6/2014 | Polachi |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1* | 9/2014 | Cheng ................... E05B 47/026 |
| | | 292/144 |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |

(56) References Cited

U.S. PATENT DOCUMENTS

| | | |
|---|---|---|
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0142753 A1 | 5/2015 | Soon-shiong |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0186497 A1 | 7/2015 | Patton et al. |
| 2015/0222814 A1 | 8/2015 | Li et al. |
| 2015/0237472 A1 | 8/2015 | Alsina et al. |
| 2015/0261917 A1 | 9/2015 | Smith |
| 2015/0271779 A1* | 9/2015 | Alavudin ............ H04W 64/003 455/456.1 |
| 2015/0312184 A1 | 10/2015 | Langholz et al. |
| 2015/0350136 A1 | 12/2015 | Flynn, III et al. |
| 2015/0358806 A1* | 12/2015 | Salqvist ................. H04W 8/02 455/433 |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0230315 A1* | 8/2017 | Zubas .................. H04L 51/043 |
| 2017/0287006 A1 | 10/2017 | Azmoodeh et al. |
| 2018/0225687 A1 | 8/2018 | Ahmed et al. |

FOREIGN PATENT DOCUMENTS

| | | | |
|---|---|---|---|
| EP | 2051480 | A1 | 4/2009 |
| EP | 2151797 | A1 | 2/2010 |
| GB | 2399928 | A | 9/2004 |
| KR | 19990073076 | A | 10/1999 |
| KR | 20010078417 | A | 8/2001 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2006118755 | A2 | 11/2006 |
| WO | WO-2007092668 | A2 | 8/2007 |
| WO | WO-2009043020 | A2 | 4/2009 |
| WO | WO-2011040821 | A1 | 4/2011 |
| WO | WO-2011119407 | A1 | 9/2011 |
| WO | WO-2013008238 | A1 | 1/2013 |
| WO | WO-2013045753 | A1 | 4/2013 |
| WO | WO-2014006129 | A1 | 1/2014 |
| WO | WO-2014068573 | A1 | 5/2014 |
| WO | WO-2014115136 | A1 | 7/2014 |
| WO | WO-2014194262 | A2 | 12/2014 |
| WO | WO-2015192026 | A1 | 12/2015 |
| WO | WO-2016044424 | A1 | 3/2016 |
| WO | WO-2016054562 | A1 | 4/2016 |
| WO | WO-2016065131 | A1 | 4/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016149594 | A1 | 9/2016 |
| WO | WO-2016179166 | A1 | 11/2016 |
| WO | WO-2018144931 | A1 | 8/2018 |

OTHER PUBLICATIONS

"Adding photos to your listing", eBay, URL: http://pages.ebay.com/help/sell/pictures.html, (accessed May 24, 2017), 4 pgs.

"U.S. Appl. No. 14/304,855, Corrected Notice of Allowance dated Jun. 26, 2015", 8 pgs.

"U.S. Appl. No. 14/304,855, Final Office Action dated Feb. 18, 2015", 10 pgs.

"U.S. Appl. No. 14/304,855, Non Final Office Action dated Mar. 18, 2015", 9 pgs.

"U.S. Appl. No. 14/304,855, Non Final Office Action dated Oct. 22, 2014", 11 pgs.

"U.S. Appl. No. 14/304,855, Notice of Allowance dated Jun. 1, 2015", 11 pgs.

"U.S. Appl. No. 14/304,855, Response filed Feb. 25, 2015 to Final Office Action dated Feb. 18, 2015", 5 pgs.

"U.S. Appl. No. 14/304,855, Response filed Apr. 1, 2015 to Non Final Office Action dated Mar. 18, 2015", 4 pgs.

"U.S. Appl. No. 14/304,855, Response filed Nov. 7, 2014 to Non Final Office Action dated Oct. 22, 2014", 5 pgs.

"U.S. Appl. No. 14/494,226, Examiner Interview Summary dated Oct. 27, 2016", 3 pgs.

"U.S. Appl. No. 14/494,226, Examiner Interview Summary dated Dec. 20, 2017", 2 pgs.

"U.S. Appl. No. 14/494,226, Final Office Action dated Mar. 7, 2017", 34 pgs.

"U.S. Appl. No. 14/494,226, Final Office Action dated Jun. 1, 2018", 33 pgs.

"U.S. Appl. No. 14/494,226, Non Final Office Action dated Sep. 7, 2017", 36 pgs.

"U.S. Appl. No. 14/494,226, Non Final Office Action dated Sep. 12, 2016", 32 pgs.

"U.S. Appl. No. 14/494,226, Response filed Jan. 8, 2018 to Non Final Office Action dated Sep. 7, 2017", 15 pgs.

"U.S. Appl. No. 14/494,226, Response filed Jul. 7, 2017 to Final Office Action dated Mar. 7, 2017", 13 pgs.

"U.S. Appl. No. 14/494,226, Response filed Dec. 12, 2016 to Non Final Office Action dated Sep. 12, 2016", 16 pgs.

"U.S. Appl. No. 14/505,478, Advisory Action dated Apr. 14, 2015", 3 pgs.

"U.S. Appl. No. 14/505,478, Corrected Notice of Allowance dated May 18, 2016", 2 pgs.

"U.S. Appl. No. 14/505,478, Corrected Notice of Allowance dated Jul. 22, 2016", 2 pgs.

"U.S. Appl. No. 14/505,478, Final Office Action dated Mar. 17, 2015", 16 pgs.

"U.S. Appl. No. 14/505,478, Non Final Office Action dated Jan. 27, 2015", 13 pgs.

"U.S. Appl. No. 14/505,478, Non Final Office Action dated Sep. 4, 2015", 19 pgs.

"U.S. Appl. No. 14/505,478, Notice of Allowance dated Apr. 28, 2016", 11 pgs.

"U.S. Appl. No. 14/505,478, Notice of Allowance dated Aug. 26, 2016", 11 pgs.

"U.S. Appl. No. 14/505,478, Response filed Jan. 30, 2015 to Non Final Office Action dated Jan. 27, 2015", 10 pgs.

"U.S. Appl. No. 14/505,478, Response filed Mar. 4, 2016 to Non Final Office Action dated Sep. 4, 2015", 12 pgs.

"U.S. Appl. No. 14/505,478, Response filed Apr. 1, 2015 to Final Office Action dated Mar. 17, 2015", 6 pgs.

"U.S. Appl. No. 14/506,478, Response filed Aug. 17, 2015 to Advisory Action dated Apr. 14, 2015", 10 pgs.

"U.S. Appl. No. 14/523,728, Non Final Office Action dated Dec. 12, 2014", 10 pgs.

(56) References Cited

OTHER PUBLICATIONS

"U.S. Appl. No. 14/523,728, Notice of Allowance dated Mar. 24, 2015", 8 pgs.
"U.S. Appl. No. 14/523,728, Notice of Allowance dated Apr. 15, 2015", 8 pgs.
"U.S. Appl. No. 14/523,728, Notice of Allowance dated Jun. 5, 2015", 8 pgs.
"U.S. Appl. No. 14/523,728, Response filed Aug. 25, 2014 to Non Final Office Action dated Jan. 16, 2015", 5 pgs.
"U.S. Appl. No. 14/529,064, Examiner Interview Summary dated May 23, 2016", 3 pgs.
"U.S. Appl. No. 14/529,064, Examiner Interview Summary dated Nov. 17, 2016", 3 pgs.
"U.S. Appl. No. 14/529,064, Final Office Action dated Jan. 25, 2018", 39 pgs.
"U.S. Appl. No. 14/529,064, Final Office Action dated Aug. 11, 2015", 23 pgs.
"U.S. Appl. No. 14/529,064, Final Office Action dated Aug. 24, 2016", 23 pgs.
"U.S. Appl. No. 14/529,064, Non Final Office Action dated Mar. 12, 2015", 20 pgs.
"U.S. Appl. No. 14/529,064, Non Final Office Action dated Apr. 6, 2017", 25 pgs.
"U.S. Appl. No. 14/529,064, Non Final Office Action dated Apr. 18, 2016", 21 pgs.
"U.S. Appl. No. 14/529,064, Non Final Office Action dated Jul. 13, 2018", 38 pgs.
"U.S. Appl. No. 14/529,064, Response filed Feb. 5, 2015 to Restriction Requirement dated Feb. 2, 2015", 6 pgs.
"U.S. Appl. No. 14/529,064, Response filed Mar. 26, 2015 to Non Final Office Action dated Mar. 12, 2015", 8 pgs.
"U.S. Appl. No. 14/529,064, Response filed May 25, 2018 to Final Office Action dated Jan. 25, 2018", 20 pgs.
"U.S. Appl. No. 14/529,064, Response filed Jul. 18, 2016 to Non Final Office Action dated Apr. 18, 2016", 20 pgs.
"U.S. Appl. No. 14/529,064, Response filed Sep. 6, 2017 to Non Final Office Action dated Apr. 6, 2017", 19 pgs.
"U.S. Appl. No. 14/529,064, Response filed Oct. 12, 2015 to Final Office Action dated Aug. 11, 2015", 19 pgs.
"U.S. Appl. No. 14/529,064, Response filed Dec. 21, 2016 to Final Office Action dated Aug. 24, 2016", 17 pgs.
"U.S. Appl. No. 14/529,064, Restriction Requirement dated Feb. 2, 2015", 5 pgs.
"U.S. Appl. No. 14/539,391, Notice of Allowance dated Mar. 5, 2015", 17 pgs.
"U.S. Appl. No. 14/548,590, Advisory Action dated Apr. 19, 2018", 2 pgs.
"U.S. Appl. No. 14/548,590, Advisory Action dated Nov. 18, 2016", 3 pgs.
"U.S. Appl. No. 14/548,590, Appeal Brief Filed Apr. 20, 2018", 28 pgs.
"U.S. Appl. No. 14/548,590, Final Office Action dated Jul. 5, 2016", 16 pgs.
"U.S. Appl. No. 14/548,590, Final Office Action dated Jul. 18, 2017", 20 pgs.
"U.S. Appl. No. 14/548,590, Final Office Action dated Sep. 16, 2015", 15 pgs.
"U.S. Appl. No. 14/548,590, Non Final Office Action dated Jan. 9, 2017", 14 pgs.
"U.S. Appl. No. 14/548,590, Non Final Office Action dated Feb. 11, 2016", 16 pgs.
"U.S. Appl. No. 14/548,590, Non Final Office Action dated Apr. 20, 2015", 14 pgs.
"U.S. Appl. No. 14/548,590, Response filed May 9, 2017 to Non Final Office Action dated Jan. 9, 2017", 17 pgs.
"U.S. Appl. No. 14/548,590, Response filed May 10, 2016 to Non Final Office Action dated Feb. 11, 2016", 14 pgs.
"U.S. Appl. No. 14/548,590, Response filed Nov. 7, 2016 to Final Office Action dated Jul. 5, 2016", 14 pgs.
"U.S. Appl. No. 14/548,590, Response filed Dec. 16, 2015 to Final Office Action dated Sep. 16, 2015", 13 pgs.
"U.S. Appl. No. 14/548,590, Response filed Jun. 16, 2015 to Non Final Office Action dated Apr. 20, 2015", 19 pgs.
"U.S. Appl. No. 14/578,258, Examiner Interview Summary dated Nov. 25, 2015", 3 pgs.
"U.S. Appl. No. 14/578,258, Non Final Office Action dated Jun. 10, 2015", 12 pgs.
"U.S. Appl. No. 14/578,258, Notice of Allowance dated Feb. 26, 2016", 5 pgs.
"U.S. Appl. No. 14/578,258, Response filed Dec. 10, 2015 to Non Final Office Action dated Jun. 10, 2015", 11 pgs.
"U.S. Appl. No. 14/578,271, Final Office Action dated Dec. 3, 2015", 15 pgs.
"U.S. Appl. No. 14/578,271, Non Final Office Action dated Aug. 7, 2015", 12 pgs.
"U.S. Appl. No. 14/578,271, Notice of Allowance dated Dec. 7, 2016", 7 pgs.
"U.S. Appl. No. 14/578,271, Response filed Feb. 9, 2016 to Final Office Action dated Dec. 3, 2015", 10 pgs.
"U.S. Appl. No. 14/578,271, Response filed Jun. 19, 2015 to Restriction Requirement dated Apr. 23, 2015", 6 pgs.
"U.S. Appl. No. 14/578,271, Response filed Oct. 28, 2015 to Non Final Office Action dated Aug. 7, 2015", 9 pgs.
"U.S. Appl. No. 14/578,271, Restriction Requirement dated Apr. 23, 2015", 8 pgs.
"U.S. Appl. No. 14/594,410, Non Final Office Action dated Jan. 4, 2016", 10 pgs.
"U.S. Appl. No. 14/594,410, Notice of Allowance dated Aug. 2, 2016", 5 pgs.
"U.S. Appl. No. 14/594,410, Notice of Allowance dated Dec. 15, 2016", 6 pgs.
"U.S. Appl. No. 14/594,410, Response filed Jul. 1, 2016 to Non Final Office Action dated Jan. 4, 2016", 10 pgs.
"U.S. Appl. No. 14/612,692, Examiner Interview Summary dated Jan. 29, 2016", 5 pgs.
"U.S. Appl. No. 14/612,692, Examiner Interview Summary dated Jul. 6, 2016", 4 pgs.
"U.S. Appl. No. 14/612,692, Examiner Interview Summary dated Aug. 14, 2015", 3 pgs.
"U.S. Appl. No. 14/612,692, Examiner Interview Summary dated Sep. 8, 2016", 3 pgs.
"U.S. Appl. No. 14/612,692, Final Office Action dated Aug. 15, 2016", 18 pgs.
"U.S. Appl. No. 14/612,692, Final Office Action dated Nov. 23, 2015", 15 pgs.
"U.S. Appl. No. 14/612,692, Non Final Office Action dated Jan. 3, 2017", 17 pgs.
"U.S. Appl. No. 14/612,692, Non Final Office Action dated Mar. 28, 2016", 15 pgs.
"U.S. Appl. No. 14/612,692, Non Final Office Action dated Jul. 20, 2015", 25 pgs.
"U.S. Appl. No. 14/612,692, Response filed Feb. 23, 2016 to Final Office Action dated Nov. 23, 2015", 10 pgs.
"U.S. Appl. No. 14/612,692, Response filed May 3, 2017 to Non Final Office Action dated Jan. 3, 2017", 18 pgs.
"U.S. Appl. No. 14/612,692, Response filed Nov. 14, 2016 to Final Office Action dated Aug. 15, 2016", 15 pgs.
"U.S. Appl. No. 14/612,692, Response filed Jun. 28, 2016 to Non Final Office Action dated Mar. 28, 2016", 14 pgs.
"U.S. Appl. No. 14/612,692. Response filed Oct. 19, 2015 to Non Final Office Action dated Jul. 20, 2015", 11 pgs.
"U.S. Appl. No. 14/634,417, Advisory Action dated Mar. 14, 2017", 3 pgs.
"U.S. Appl. No. 14/634,417, Final Office Action dated Jan. 31, 2017", 27 pgs.
"U.S. Appl. No. 14/634,417, Non Final Office Action dated Aug. 30, 2016", 23 pgs.
"U.S. Appl. No. 14/634,417, Response filed Mar. 2, 2017 to Final Office Action dated Jan. 31, 2017", 23 pgs.
"U.S. Appl. No. 14/634,417, Response filed Nov. 30, 2016 to Non Final Office Action dated Aug. 30, 2016", 18 pgs.

(56) References Cited

OTHER PUBLICATIONS

"U.S. Appl. No. 14/682,259, Notice of Allowance dated Jul. 27, 2015", 17 pgs.
"U.S. Appl. No. 14/704,212, Final Office Action dated Jun. 17, 2016", 12 pgs.
"U.S. Appl. No. 14/704,212, Non Final Office Action dated Dec. 4, 2015", 17 pgs.
"U.S. Appl. No. 14/704,212, Response filed Mar. 4, 2016 to Non Final Office Action dated Dec. 4, 2015", 11 pgs.
"U.S. Appl. No. 14/738,069, Non Final Office Action dated Mar. 21, 2016", 12 pgs.
"U.S. Appl. No. 14/738,069, Notice of Allowance dated Aug. 17, 2016", 6 pgs.
"U.S. Appl. No. 14/738,069, Response filed Jun. 10, 2016 to Non Final Office Action dated Mar. 21, 2016", 10 pgs.
"U.S. Appl. No. 14/808,283, Notice of Allowance dated Apr. 12, 2016", 9 pgs.
"U.S. Appl. No. 14/808,283, Notice of Allowance dated Jul. 14, 2016", 8 pgs.
"U.S. Appl. No. 14/808,283, Preliminary Amendment filed Jul. 24, 2015", 8 pgs.
"U.S. Appl. No. 14/841,987, Notice of Allowance dated Mar. 29, 2017", 17 pgs.
"U.S. Appl. No. 14/841,987, Notice of Allowance dated Aug. 7, 2017", 8 pgs.
"U.S. Appl. No. 14/967,472, Final Office Action dated Mar. 10, 2017", 15 pgs.
"U.S. Appl. No. 14/967,472, Non Final Office Action dated Sep. 8, 2016", 11 pgs.
"U.S. Appl. No. 14/967,472, Preliminary Amendment filed Dec. 15, 2015", 6 pgs.
"U.S. Appl. No. 14/967,472, Response filed Dec. 5, 2016 to Non Final Office Action dated Sep. 8, 2016", 11 pgs.
"U.S. Appl. No. 15/074,029, Final Office Action dated Jun. 28, 2018", 22 pgs.
"U.S. Appl. No. 15/074,029, Non Final Office Action dated Nov. 30, 2017", 16 pgs.
"U.S. Appl. No. 15/074,029, Response filed Feb. 28, 2018 to Non Final Office Action dated Nov. 30, 2017", 12 pgs.
"U.S. Appl. No. 15/137,608, Preliminary Amendment filed Apr. 26, 2016", 6 pgs.
"U.S. Appl. No. 15/152,975, Non Final Office Action dated Jan. 12, 2017", 36 pgs.
"U.S. Appl. No. 15/152,975, Preliminary Amendment filed May 19, 2016", 8 pgs.
"U.S. Appl. No. 15/208,460, Notice of Allowance dated Feb. 27, 2017", 8 pgs.
"U.S. Appl. No. 15/208,460, Notice of Allowance dated Dec. 30, 2016", 9 pgs.
"U.S. Appl. No. 15/208,460, Supplemental Preliminary Amendment filed Jul. 18, 2016", 8 pgs.
"U.S. Appl. No. 15/224,312, Preliminary Amendment filed Feb. 1, 2017", 11 pgs.
"U.S. Appl. No. 15/224,343, Preliminary Amendment filed Jan. 31, 2017", 10 pgs.
"U.S. Appl. No. 15/224,355, Preliminary Amendment filed Apr. 3, 2017", 12 pgs.
"U.S. Appl. No. 15/224,372, Preliminary Amendment filed May 5, 2017", 10 pgs.
"U.S. Appl. No. 15/224,359, Preliminary Amendment filed Apr. 19, 2017", 8 pgs.
"U.S. Appl. No. 15/298,806, Advisory Action dated Jan. 29, 2018", 4 pgs.
"U.S. Appl. No. 15/298,806, Examiner Interview Summary dated Jan. 12, 2018", 3 pgs.
"U.S. Appl. No. 15/298,806, Examiner Interview Summary dated Aug. 13, 2018", 3 pgs.
"U.S. Appl. No. 15/298,806, Final Office Action dated Oct. 24, 2017", 15 pgs.
"U.S. Appl. No. 15/298,806, Non Final Office Action dated May 17, 2018", 16 pgs.
"U.S. Appl. No. 15/298,806, Non Final Office Action dated Jun. 12, 2017", 26 pgs.
"U.S. Appl. No. 15/298,806, Preliminary Amendment filed Oct. 21, 2016", 8 pgs.
"U.S. Appl. No. 15/298,806, Response filed Jan. 9, 2018 to Final Office Action dated Oct. 24, 2017", 17 pgs.
"U.S. Appl. No. 15/298,806, Response filed Aug. 10, 2018 to Non Final Office Action dated May 17, 2018", 15 pgs.
"U.S. Appl. No. 15/298,806, Response filed Sep. 12, 2017 to Non Final Office Action dated Jun. 12, 2017", 12 pgs.
"U.S. Appl. No. 15/416,846, Preliminary Amendment filed Feb. 18, 2017", 10 pgs.
"U.S. Appl. No. 15/486,111, Corrected Notice of Allowance dated Sep. 7, 2017", 3 pgs.
"U.S. Appl. No. 15/486,111, Non Final Office Action dated May 9, 2017", 17 pgs.
"U.S. Appl. No. 15/486,111, Notice of Allowance dated Aug. 30, 2017", 5 pgs.
"U.S. Appl. No. 15/486,111, Response filed Aug. 9, 2017 to Non Final Office Action dated May 9, 2017", 11 pgs.
"U.S. Appl. No. 15/835,100, Non Final Office Action dated Jan. 23, 2018", 18 pgs.
"U.S. Appl. No. 15/835,100, Notice of Allowance dated May 22, 2018", 5 pgs.
"U.S. Appl. No. 15/835,100, Response Filed Apr. 23, 2018 to Non Final Office Action dated Jan. 23, 2018", 11 pgs.
"BlogStomp", StompSoftware, URL: http://stompsoftware.com/blogstomp, (accessed May 24, 2017), 12 pgs.
"Canadian Application Serial No. 2,894,332 Response filed Jan. 24, 2017 to Office Action dated Aug. 16, 2016", 15 pgs.
"Canadian Application Serial No. 2,894,332, Office Action dated Aug. 16, 2016", 4 pgs.
"Canadian Application Serial No. 2,910,158, Office Action dated Dec. 15, 2016", 5 pgs.
"Canadian Application Serial No. 2,910,158, Response filed Apr. 11, 2017 to Office Action dated Dec. 15, 2016", 21 pgs.
"Cup Magic Starbucks Holiday Red Cups come to life with AR app", Blast Radius, URL: http://www.blastradius.com/work/cup-magic, (2016), 7 pgs.
"Daily App: InstaPlace (iOS/Android): Give Pictures a Sense of Place", TechPP, URL: http://techpp.com/2013/02/15/instaplace-app-review, (2013), 13 pgs.
"European Application Serial No. 16716090.2, Response filed May 21, 2018 to Communication pursuant to Rules 161(1) and 162 EPC dated Nov. 10, 2017", w/ English Claims, 89 pgs.
"How Snaps Are Stored and Deleted", Snapchat (Online), URL: https://www.snap.com/en-US/news/post/how-snaps-are-stored-and-deleted/, (May 9, 2013), 2 pgs.
"InstaPlace Photo App Tell the Whole Story", URL: https://youtu.be/uF_gFkg1hBM, (Nov. 8, 2013), 113 pgs.
"International Application Serial No. PCT/EP2008/063682, International Search Report dated Nov. 24, 2008", 3 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/035591, International Preliminary Report on Patentability dated Dec. 22, 2016", 7 pgs.
"International Application Serial No. PCT/US2015/035591, International Search Report dated Aug. 11, 2015", 5 pgs.
"International Application Serial No. PCT/US2015/035591, International Written Opinion dated Aug. 11, 2015", 5 pgs.
"International Application Serial No. PCT/US2015/037251, International Search Report dated Sep. 29, 2015", 2 pgs.
"International Application Serial No. PCT/US2015/050424, International Search Report dated Dec. 4, 2015", 2 pgs.
"International Application Serial No. PCT/US2015/050424, Written Opinion dated Dec. 4, 2015", 10 pgs.

(56) References Cited

OTHER PUBLICATIONS

"International Application Serial No. PCT/US2015/053811, International Preliminary Report on Patentability dated Apr. 13, 2017", 9 pgs.
"International Application Serial No. PCT/US2015/053811, International Search Report dated Nov. 23, 2015", 5 pgs.
"International Application Serial No. PCT/US2015/053811, Written Opinion dated Nov. 23, 2015", 8 pgs.
"International Application Serial No. PCT/US2015/056884, International Preliminary Report on Patentability dated May 4, 2017", 8 pgs.
"International Application Serial No. PCT/US2015/056884, International Search Report dated Dec. 22, 2015", 5 pgs.
"International Application Serial No. PCT/US2015/056884, Written Opinion dated Dec. 22, 2015", 6 pgs.
"International Application Serial No. PCT/US2015/065785, International Search Report dated Jul. 21, 2016", 5 pgs.
"International Application Serial No. PCT/US2015/065785, Written Opinion dated Jul. 21, 2016", 5 pgs.
"International Application Serial No. PCT/US2015/065821, International Search Report dated Mar. 3, 2016", 2 pgs.
"International Application Serial No. PCT/US2015/065821, Written Opinion dated Mar. 3, 2016", 3 pgs.
"International Application Serial No. PCT/US2016/023085, International Preliminary Report on Patentability dated Sep. 28, 2017", 8 pgs.
"International Application Serial No. PCT/US2016/023085, International Search Report dated Jun. 17, 2016", 5 pgs.
"International Application Serial No. PCT/US2016/023085, Written Opinion dated Jun. 17, 2016", 6 pgs.
"International Application Serial No. PCT/US2018/016723, International Search Report dated Apr. 5, 2018", 2 pgs.
"International Application Serial No. PCT/US2018/016723, Written Opinion dated Apr. 5, 2018", 17 pgs.
"Introducing Snapchat Stories", URL: https://www.youtube.com/watch?v=88Cu3yN-LIM, (Oct. 3, 2013), 92 pgs.
"iVisit Mobile: Getting Started", iVisit (Archived Online), URL: http://web.archive.org/web/20140830174355/http://ivisit.com/support_mobile, (Dec. 4, 2013), 16 pgs.
"Macy's Believe-o-Magic", URL: https://www.youtube.com/watch?v=xvzRXy3J0Z0, (Nov. 7, 2011), 102 pgs.
"Macys Introduces Augmented Reality Experience in Stores across Country as Part of Its 2011 Believe Campaign", Business Wire, URL: https://www.businesswire.com/news/home/20111102006759/en/Macys-Introduces-Augmented-Reality-Experience-Stores-Country, (Nov. 2, 2011), 6 pgs.
"Pluraleyes by Red Giant", © 2002-2015 Red Giant LLC, [Online]. Retrieved from the Internet: <URL: http://www.redgiant.com/products/pluraleyes/, (Accessed Nov. 11, 2015), 5 pgs.
"Starbucks Cup Magic", URL: https://www.youtube.com/watch?v=RWwQXi9RG0w, (Nov. 8, 2011), 87 pgs.
"Starbucks Cup Magic for Valentine's Day", URL: https://www.youtube.com/watch?v=8nvqOzjq10w, (Feb. 6, 2012), 88 pgs.
"Starbucks Holiday Red Cups Come to Life, Signaling the Return of the Merriest Season", Business Wire, URL: http://www.businesswire.com/news/home/20111115005744/en/2479513/Starbucks-Holiday-Red-Cups-Life-Signaling-Return, (Nov. 15, 2011), 5 pgs.
Carthy, Roi, "Dear All Photo Apps: Mobli Just Won Filters", URL: https://techcrunch.com/2011/09/08/mobil-filters, (Sep. 8, 2011), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Clarke, Tangier, "Automatically syncing multiple clips and lots of audio like PluralEyes possible?", [Online]. Retrieved from the Internet: <URL: https://forums.creativecow.net/thread/344/20553, (May 21, 2013), 8 pgs.
Janthong, Isaranu, "Instaplace ready on Android Google Play store", Android App Review Thailand, URL: http://www.android-free-app-review.com/2013/01/instaplace-android-google-play-store.html, (Jan. 23, 2013), 9 pgs.
Leyden, John, "This SMS will self-destruct in 40 seconds", URL: http://www.theregister.co.uk/2005/12/12/stealthtext/, (Dec. 12, 2005), 1 pg.
MacLeod, Duncan, "Macys Believe-o-Magic App", URL: http://theinspirationroom.com/daily/2011/macys-believe-o-magic-app, (Nov. 14, 2011), 10 pgs.
MacLeod, Duncan, "Starbucks Cup Magic Lets Merry", URL: http://theinspirationroom.com/daily/2011/starbucks-cup-magic, (Nov. 12, 2011), 8 pgs.
Melanson, Mike, "This text message will self destruct in 60 seconds", URL: http://readwrite.com/2011/02/11/this_text_message_will_self_destruct_in_60_seconds, (Feb. 18, 2015), 4 pgs.
Notopoulos, Katie, "A Guide to the New Snapchat Filters and Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.
Panzarino, Matthew, "Snapchat Adds Filters, A Replay Function and for Whatever Reason, Time, Temperature and Speed Overlays", URL: https://techcrunch.com/2013/12/20/snapchat-adds-filters-new-font-and-for-some-reason-time-temperature-and-speed-overlays/, (Dec. 20, 2013), 12 pgs.
Sawers, Paul, "Snapchat for iOS Lets You Send Photos to Friends and Set How long They're Visible for", URL: https://thenextweb.com/apps/2012/05/07/snapchat-for-ios-lets-you-send-photos-to-friends-and-set-how-long-theyre-visible-for/, (May 7, 2012), 5 pgs.
Shein, Esther, "Ephemeral Data", Communications of the ACM, vol. 56, No. 9, (Sep. 2013), 20-22.
Trice, Andrew, "My Favorite New Feature: Multi-Clip Sync in Premiere Pro CC", [Online]. Retrieved from the Internet: <URL: http://www.tricedesigns.com/2013/06/18/my-favorite-new-feature-multi-cam-synch-in-premiere-pro-cc/, (Jun. 18, 2013), 5 pgs.
Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.

\* cited by examiner

LOCATION-BASED MESSAGING

PRIORITY

This application is a continuation and claims priority to U.S. patent application Ser. No. 15/835,100, filed Dec. 7, 2017, which is a continuation and claims priority to U.S. patent application Ser. No. 15/486,111, filed Apr. 12, 2017, which is a continuation and claims priority to U.S. patent application Ser. No. 14/594,410, filed Jan. 12, 2015, which claims priority to U.S. Provisional Ser. No. 61/926,324 filed on Jan. 12, 2014, each of which are hereby incorporated by reference in their entirety for all purposes.

TECHNICAL FIELD

This application relates generally to mobile messaging systems, and more specifically to methods, systems, and devices to enable location based messages to be generated by a user for receipt by a selected recipient when the selected recipient is within a location associated with a message.

BACKGROUND

The ever increasing use of smart phones and other mobile devices with data connections and location determination capabilities is slowly changing the way people interact. Such mobile devices can provide users with nearly universal connections to a network. Such mobile devices also commonly include mechanisms, such as global positioning system (GPS) receivers and network assisted location services that allow the devices to determine location information. Embodiments described herein relate to the use of such mobile devices for location based messaging.

BRIEF DESCRIPTION OF THE DRAWINGS

Some embodiments are illustrated by way of example and not limitation in the figures of the accompanying drawings in which.

DETAILED DESCRIPTION

Figure 1:
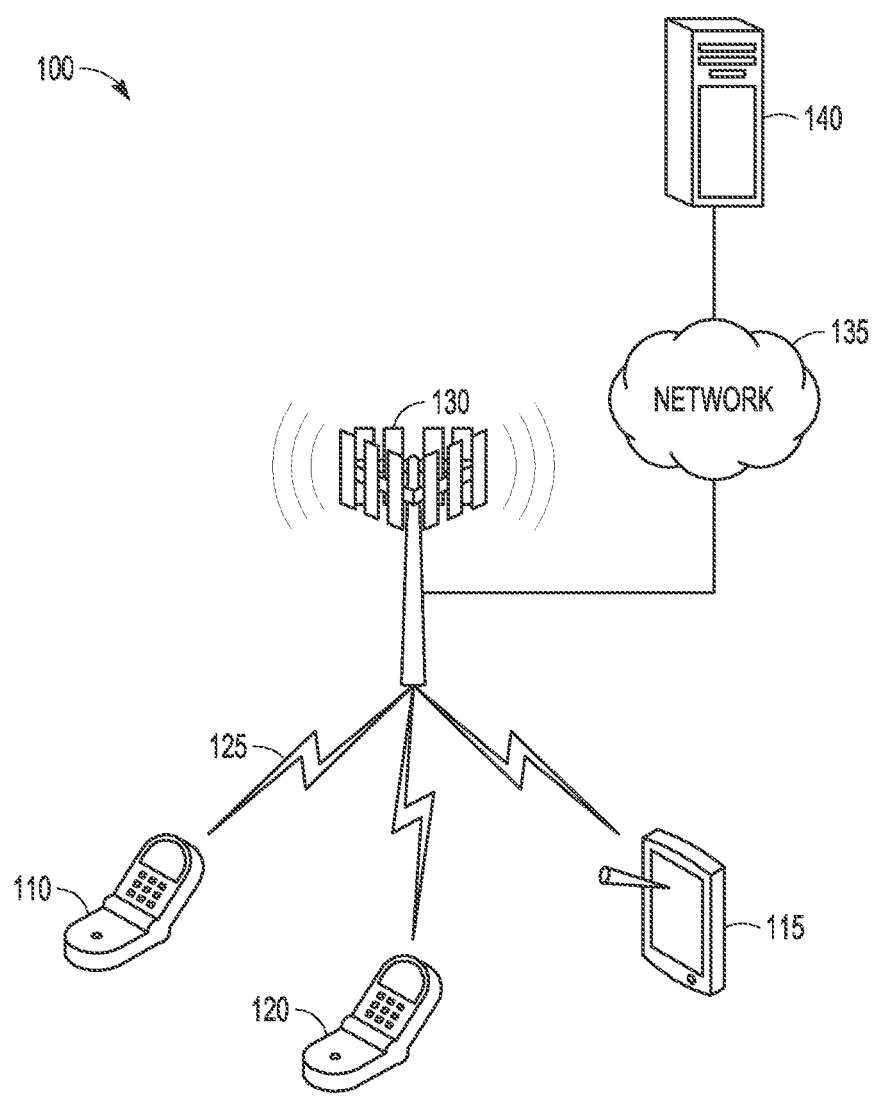
FIG. 1 is a block diagram depicting a system for location based messaging in accordance with certain embodiments.

Example systems and methods are described for location based communications. In particular, certain example embodiments show communications generated by a user on a mobile device that are configured to be made available to a selected recipient when that recipient is within a target location. Certain embodiments provide systems for both sending and receiving location based content to a user-defined audience, with individual recipients identified by a sender using a sender's contacts.

For example, in one embodiment, a user may want to send a location based message to a roommate reminding the roommate to pick up pet food when the roommate is at the store. Prior to the message being generated, the user and the roommate that is to receive the message each separately register devices with separate location based messaging accounts. As part of each registration process, the user and the message recipient may each download an application for location based messaging to their respective registered devices. Additionally, the roommate enables the sender to target the recipient's device or devices with location based messages. The user is then able to generate a location based message from the user's device targeting the roommate's device.

As part of generation of a location based message, the user then inputs an identifier for the roommate to the user's device. The identifier is used to identify the roommate as the message recipient. The user also inputs information to select a delivery area as part of the location based message generation. Message content is then associated with the identifier and the delivery area. This may be a text message saying "remember the pet food," an image such as a picture of an empty pet food bag, or a video of a pet in front of an empty food bowl. In various embodiments, the delivery of the message may be performed in a variety of different ways as described below. In one example embodiment, the roommate's device may notify the roommate that a message will be available when the roommate is at the store, without providing the message content until the roommate is within the delivery area. When the roommate's device uses location management features of the device to identify that the device is within the delivery area, then the message content will be made available for display on the roommate's device.

A location based message provides the benefit of presenting the message to the user when the recipient is in the most relevant context to receive the message, rather than presenting the message to the recipient and then relying on the recipient to remember the message when the recipient is in the appropriate context that was related to the message. There are many additional use cases for such location based messages in both personal and business settings. Non-limiting additional examples include leaving reminders for contacts at specific locations, reinforcing network contacts with communications when they are in relevant locations, delivery of location-specific content to interested individuals, reaching out to interested consumers in a given location, and many other communication types.

Figure 2:
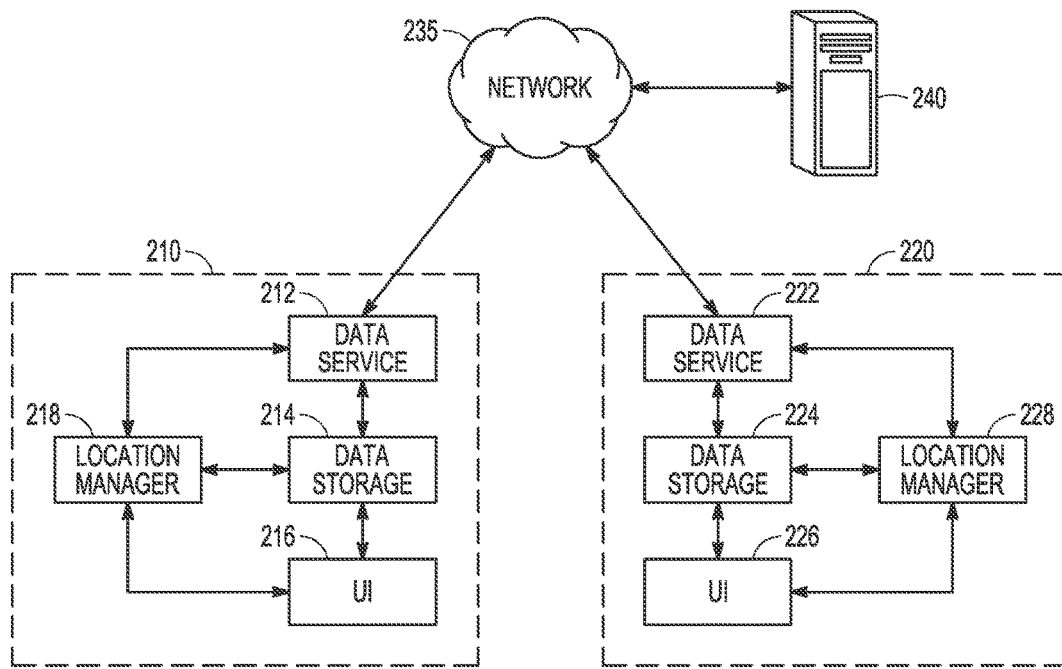
FIG. 2 is a block diagram depicting a system for location based messaging in accordance with certain embodiments.
Figure 22:
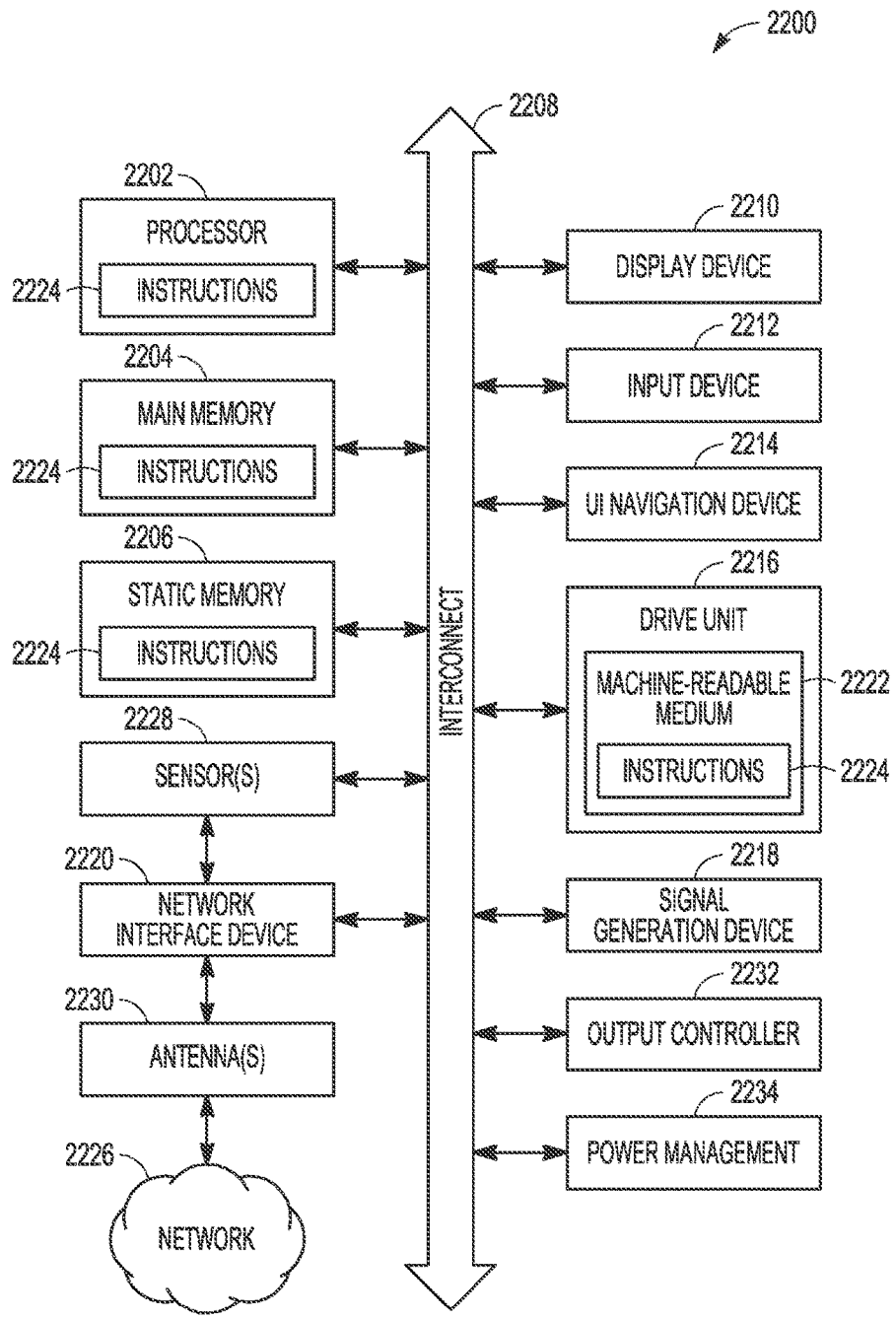
FIG. 22 is a diagrammatic representation of a machine in the example form of a computer system within which a set of instructions for causing the machine to perform any one or more of the methodologies discussed herein may be executed.

FIGS. 1 and 2 describe network communication systems in which location based messages may be implemented in accordance with various embodiments described herein. FIG. 1 illustrates a wireless network 100 in accordance with some embodiments. The wireless network 100 includes mobile devices 110, 115, and 120. The mobile devices 110, 115, and 120 may be, for example, laptop computers, smart phones, tablet computers, phablet devices, or any other network enabled wireless device. FIG. 22 provides additional details of one embodiment of a computing device which may be used to implement any of mobile devices 110, 115, and 120.

Wireless devices 110, 115, and 120 are configured to communicate with each other and with other devices via a wireless connection 125 to a communication node 130. Communication node 130 may be any access point, cellular node, or other source of wireless access to network 135. Wireless connection 125 may be enabled via any communication standard or protocol, such as IEEE 802.11, 3GPP LTE, Bluetooth, mesh networks, beacons, or any other such communication method.

Network 135 then provides access to cloud server computer 140. Network 135 may include a local area network, a wide area network, or the Internet, and may comprise any number of communication devices. In certain embodiments cloud server computer 135 may manage system accounts and identifiers used for location based communications. Cloud server computer 135 may also provide map information and network based location assistance that may be used as part of location based communications described herein.

FIG. 2 then describes one embodiment of application level communications between multiple mobile devices such as mobile devices 110, 115, and 120 illustrated as system 200. FIG. 2 includes location based messaging modules, illustrated as messaging module 210 and messaging module 220. Messaging module 210 is implemented on a mobile device such as mobile device 110, and messaging module 220 is implemented on a separate mobile device such as mobile device 120. The messaging modules are communicatively coupled with each other via network 235 to enable location based messages to be sent between messaging modules 210 and 220. Messaging modules are also communicatively coupled to cloud based server computer 240, which may manage aspects of location based communications including accounts, identifiers, message routing, or other such aspects of a location based communication.

Each messaging module manages both outbound and inbound location based communications. In the embodiment of FIG. 2, each messaging module includes data service module, a data storage module, a location manager module, and a user interface module. As illustrated, messaging module 210 includes data service module 212, data storage module 215, user interface (UI) module 216, and location manager module 218. Similarly, messaging module 220 includes data service module 222, data storage module 224, UI module 226, and location manager module 228.

UI modules 216 and 226 manage the receipt of inputs from input devices such as input device 2212, UI navigation device 2214, or any sources of user input data generated by a user interacting with a mobile device on which the corresponding messaging module for each UI module 216 and 226 are operating. This includes user inputs selecting a message recipient identifier. This includes user inputs identifying a geofence or boundary area which is used to delineate a delivery area. This also includes input commands used to generate or select elements of a content message that is part of a location based communication, such as text inputs, image selection, video selection, generation of graphics or illustrations as part of a user input, or any other such data that may be part of a content message. UI modules 216 and 226 may also manage output of notifications on an output of a mobile device, including audio alerts, display of content messages when a mobile device is within a delivery area, display of interface options, mobile device vibrations, and any other such output elements described herein.

Location manager modules 218 and 228 manage location measurements of a mobile device based on default settings and user selections received from a corresponding UI module. Location manager modules 218 and 228 may thus initiate location measurements using global navigation satellite system (GNSS) elements and measurements of a mobile device, network based location measurements, or any other such location measurement or combination of location measurements. Additionally, in certain embodiments, location manager modules 218 and 228 may use geofence information to determine location states as inside or outside of a geofence or delivery area. A geofence as described herein refers to data that defines a spatial boundary. A geofence may define a delivery area, such that when a location manager module determines that a mobile device is within a geofence that defines the delivery area, a content message associated with that delivery is made available on the mobile device. Location manager modules 218 and 228 may thus both determine a location of a mobile device and determine whether the location is within a geofence as part of receipt of a message for display on a receiving mobile device. Such geofence areas may be defined by user inputs received at a UI module, or may be stored as previously define locations in data storage modules.

Data storage modules 214 and 224 manage local storage of any data that is associated with location based communications described herein. This may include any identifier information, message content information, location information, system setting information, or any other such information associated with any embodiment described herein.

Data service modules 212 and 222 manage transmission and receipt of information associated with location based communication on a corresponding mobile device. This includes communication of geofence or delivery area information, communication of message content information, and interaction with other mobile devices and/or cloud based server computers that are associated with a communication process. Data service modules 212 and 222 may additionally manage registration information, and communications with other users to establish contact settings that enable a user of a device to send and/or receive location based messages involving another user.

Figure 3:
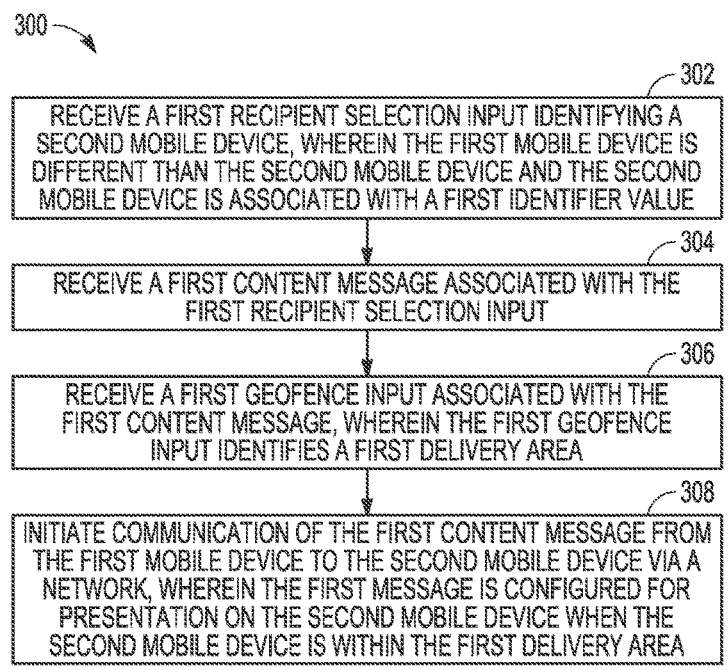
FIG. 3 illustrates a method for location based messaging according to certain embodiments.

FIG. 3 then illustrates an example embodiment of a method for location based communication, shown as method 300. For the purposes of illustration, method 300 is described below with respect to the elements of systems 100 and 200 described above. In alternative embodiments, other combinations of systems or completely different systems may be used to implement such a method. Additionally, it will be clear that other methods of location based communication are also possible in other alternative embodiments.

Method 300 is performed by a mobile device such as mobile device 110, having one or more processors such as processor 2202 and memory such as main memory 2204 and static memory 2206. Method 300, which is a location based method for communication, begins with operation 302 involving receiving, at an input device of a first mobile device 110, a first recipient selection input identifying a second mobile device 120, where the first mobile device 110 is different than the second mobile device 120 and the second mobile device is associated with a first identifier value. The input device may be a touch screen interface, a microphone with voice recognition processing element, a physical keyboard, or any other such input device that may be used with a mobile device. The first identifier value may be a previously generated identifier value as described in more detail below. The first mobile device 110 executes messaging module 210 and the second mobile device 120 executes messaging module 220. The first identifier may be stored in data storage module 214 and presented as part of UI module 216, or may be received at data service 212 from cloud based server computer 240.

Operation 304 then involves receiving at the input device of the first mobile device 110, a first content message associated with the first recipient selection input. This may involve receipt of a keyboard text input, a drawing input on a touch screen, an image or video input from a camera or a file of data storage 214, a sound input, or any other such input that may be used to generate the content message.

Operation 306 then involves receiving, at the input device of the first mobile device 110, a first geofence input associated with the first content message, wherein the first geofence input identifies a first delivery area. The first geofence input may be input as text describing latitude and longitude coordinates with an associated radius. In certain embodiments, location manager module 218 may be used to generate a geofence associated with a current or previous location of the mobile device. In other embodiments, data storage 214 may store data for a geofence that may be selected by a user input via UI module 216. In other embodiments, geofence information may be received via data service 212 from cloud based server computer 240. The first geofence input is associated with the first content message based on selections entered by a user via UI module 216 and the mobile device 110 input device or devices. Such inputs also select a geofence associated with the first geofence input as the first delivery area. In certain embodiments a single message may be associated with multiple delivery areas.

Operation 308 then involves initiating communication of the first content message from the first mobile device 110 to the second mobile device 120 via a network 230, wherein the first content message is configured for presentation on the second mobile device 120 when the second mobile device 120 is within the first delivery area. In various alternative embodiments, this may initiate a communication directly from a first mobile device 110 to a second mobile device 120 or this may initiate a communication from first mobile device 110 to a cloud server computer 140 or 240. In one potential embodiment, this may initiate a single message service (SMS) text message to the second mobile device 120 from the first mobile device 110, wherein the SMS text message indicates the availability of the first content message in the first delivery area. This SMS text message may then be used by second mobile device to download or otherwise access messaging service 220. Such an embodiment may particularly be used where a second mobile device 120 has not registered with a location based messaging service at the time that the content message is generated on the first mobile device 110.

In addition to the above described selections for generating a location based message, in certain embodiments a message sender may mark a message for future delivery in the event the sender does not want the recipient to view the message until a certain date. Users can designate messages as recurring in order for the intended recipient to receive the content on an ongoing basis once arriving at a location. Finally, a user can stipulate whether a message is sent to recipients once the recipient gets to the desired location, or conversely, when the sender gets to the intended location (e.g. send a message to pre-selected individuals when the sender arrives at the airport, etcetera). Each of these may be presented as options by a messaging module during generation of a location based communication.

Further, in addition to user-generated content, users can purchase premium content to be delivered through the messaging module. This content can be in the form of themed messages (e.g. new map icons, custom drawings, and etcetera) or pre-packaged location-based content (e.g. NYC tourist pack, US history pack, Celebrity sightings pack, and etcetera). Users may also download checklists that are accomplished upon reaching the designated locations (e.g. airports of the USA, natural wonders of the world, Michelin-starred restaurants, and etcetera). The Application can also be used to facilitate peer-to-peer payments (e.g. buying a gift card for a recipient at a given location, purchasing a dessert for a contact at a given restaurant, transferring funds to a recipient once they reach a location, etcetera). Users may receive coupons and offers from businesses and service providers of potential interest once the user is in the vicinity of the participating location. Finally, the Application may have an API that will allow $3^{rd}$ parties to use the Application's technology to deliver content on a location-enabled basis.

Figure 4:
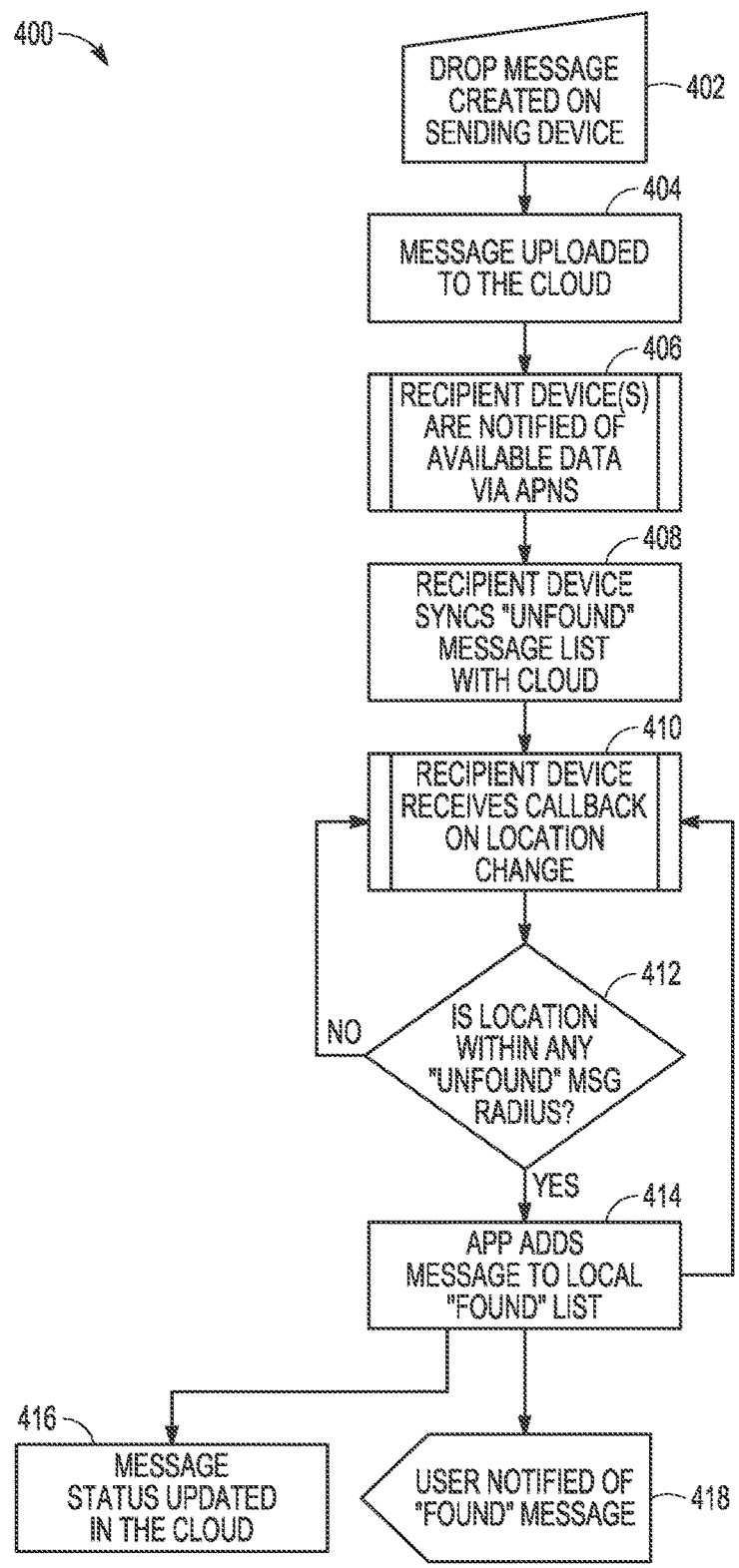
FIG. 4 illustrates a method for location based messaging according to certain embodiments.

As mentioned above, multiple different methods may be used to communicate and present a content message on a second recipient mobile device after the communication is initiated by a first mobile device. FIG. 4 describes one embodiment for such a communication. For the purposes of illustration, method 400 of FIG. 4 is described as a continuation of method 300 above, and is described in the context of FIGS. 1 and 2. Method 400 may be used with method 300, and may also be used with additional methods. Additionally, method 300 may be used with other different communication methods than method 400.

Method 400 begins with operation 402 involving a location based "drop" message being created on first mobile device 110. In one embodiment, operation 402 may be the same as method 300. In other embodiments, different methods may be used to generate a location based message.

Operation 404 then involves first mobile device 110 uploading the content message to a cloud server computer 240 using data service module 212. The cloud server computer 240 will receive, from the first mobile device 110, a location based message comprising the first identifier value, the first content message, and the first delivery area. This location based message is received in response to the communication initiated in operation 308.

Operation 406 then involves any recipient devices being notified of the available content message, including notifying the second mobile device 120, using a push message, of the location based message. In alternative embodiment, rather than cloud server computer 240 pushing a notification of the message, the cloud server computer 240 may simply automatically push a copy of the content message with information about the first delivery area to second mobile device 120.

In operation 408, second mobile device 120 synchronizes an "unfound" message list with could server computer 240 using data service module 222. This synchronization may be performed in response to the push notification from operation 406, in response to a periodic message check, in response to a new network connection establishing, for example, wireless connection 125, or based on any other such trigger to perform a message synchronization with cloud server computer 240. This synchronization verifies that the second mobile device 120 has information about the first delivery area which may be used to determine when to move the content message that is part of the location based communication to a "found" list. In one embodiment, this may involve receiving, at the second mobile device, the push message, and synchronizing, by the second mobile device, an unfound message list with the cloud server computer to receive the location based message from the cloud server computer.

In operation 410, location manager 228 receives information about a location change of second mobile device 120 that is operating messaging module 220. Such a callback on location change may involve GNSS measurements, network based location measurements, device sensors 2228, or any other such means of determining a location change.

Operation 412 may further involve location manager 228 determining a location of second mobile device 120, and comparing that location with the first delivery area identified by a geofencing input of first mobile device 110 when the location based message was created. If the second mobile device 120 is outside the first delivery area, the process repeats operations 410 and 412 until the second mobile device 120 is within the first delivery area until the message expires or is terminated.

In operation 414, after the location manager module 228 determines that the second mobile device 120 is within the first delivery area, the messaging module 220 adds the content message to a local found list within data storage module 224. In various embodiments, a single mobile device may have multiple different "unfound" messages within a list at any given time. Operations 410 through 414 may check each delivery area associated with each unfound message as part of a single operation, and may repeat this process until every unfound message is terminated or found.

In operation 416, after messaging module 220 adds the "found" message to a local found list, a message status is updated at could server computer 240. In operation 418, a notification is provided on second mobile device 120 that a message has been found and the content message is available for output on the second mobile device 120.

In another example embodiment, the message is created on the user's device. Then, the message is uploaded to the cloud. Once the message is in the cloud, the intended recipient device(s) of available data via Apple™ (or similar) push notification service ("APNS"). After receiving the notification, the recipient device(s) sync their "unfound" message list with the data available in the cloud. Once the message is stored on a user's unfound list, the messaging module on a user's device will receive feedback as the user's location changes. As soon as the user gets within the intended delivery radius as determined by a location manager module of the messaging module, the user's device outputs a notification that the user "found" the message and a message status is updated in the cloud. In alternative embodiment, the back-end configuration may be modified such that messages are "pulled" from the intended user's device rather than "pushed." Additionally, in another embodiment, the message including the location data may be immediately provided to the intended recipient's mobile device, only becoming visible or available to the intended recipient device once it enters the specified location radius. Thus, in addition to hidden messages that are only received from a cloud server computer once a recipient enters the stipulated delivery radius of a given location, users may also toggle between leaving location-specific content on a recipient's map that appears irrespective of the recipient's location. In the event the sender leaves the message on this visible basis, the sender can further choose between showing the full message and marker or simply showing the marker, without message, to encourage the recipient to move to the location in order to view the content. If the marker is shown without the content message, the content message may be stored locally, or may be stored on a cloud server computer without a copy of the content message being stored at the mobile device until the message is "found" by the mobile device entering the delivery area around the marker.

Figure 5:
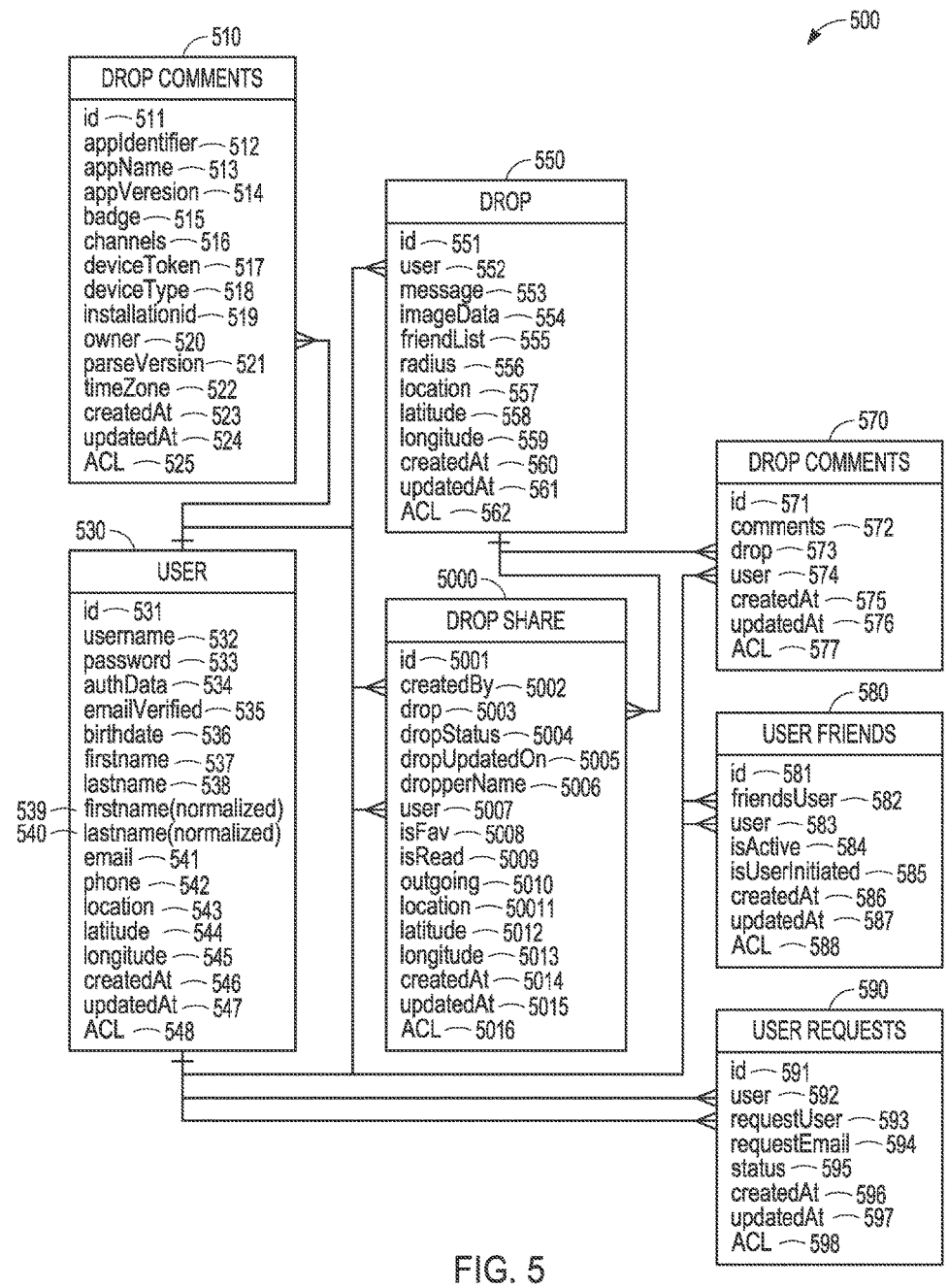
FIG. 5 illustrates aspects of certain example embodiments of a location based messaging system.

FIG. 5 then illustrates one example implementation of data structures in a system 500 that may be used by a server such as cloud server computer 140 or cloud server computer 240 as part of location based communication embodiments. Each element of system 500 represents part of a structure, and specific instances of such structures in a system may represent data within the structure format. System 500 includes installation 510 elements, user 530 elements, location based message "drop" 550 elements, which may also be referred to as "drop" message elements or simply as location based message elements. System 500 also includes location based comment 570 elements, user friend 580 comments, user request 590 elements, and location based communication share 5000 elements. Each of the structure elements listed above include entry elements as part of the structure element. Additionally, each of the various structure elements listed above may include shared entry elements as described below. Further, while system 500 includes specific structures, in various alternative implementations, other combinations of structure elements and entry elements may be combined in different ways, or may use other structure or entry elements not specifically described in system 500. In various embodiments, each of these elements may be associated with database records and communication modules, each of which may be implemented on a single cloud server computer such as cloud server computer 140. In other embodiments, each of these elements may be implemented in whole or in part on separate cloud server computers.

Installation 510 illustrates aspects of a location based messaging system related to placement of a messaging module such as messaging module 210 on a mobile device such as mobile device 110. Installation 510 includes a number of different value elements. Identifier (ID) 511 is associated with a unique identifier for each system element. Each instance of system element 510, 530, 550, 570, 580, 590, and 5000 may have an identifier assigned by a system to enable management of each record.

Additionally, each user may have an associated user element such as user 552, user 5007, user 574, user 583, and user 592 that enables the system to track which user is associated with various communications or data instances in a system. Such a user identifier may be assigned by a system upon user registration. For example, a cloud server computer such as cloud server computer 140 may assign an user identifier when a user interacts with the cloud server computer as part of a registration process. Each instance of a system element including installation 510, user 530, drop 550, drop share 5000, dropped comments 570, user friends 580, and user request 590 which is generated by the user actions may include the user's assigned identifier whenever an a data record using a particular structure element format is created. Such a user identifier is present in the various structure elements as owner 520, user 552, user 5007, user 574, user 583, and user 592. Such user identifiers may be user generated values as part of registration, e-mail values, phone number values, or values associated with other systems or networks such as Facebook™, Twitter™, or other such social network identifiers uniquely associated with an individual user. Each of these user elements associates corresponding system element with a particular user based on the value in the user element. The use of element IDs and user identifying elements enables system 500 to be manage data by having a unique ID associated with each data record in a structure element format.

Additionally, each system element may include security or control features. The embodiment of system 500 includes access control list (ACL) value elements for each system element. These ACL value elements determine which sources have read and write access to the information in a particular data instance any system element described herein. As shown, drop comments 510 includes ACL 525, user 530 includes ACL 548, drop 550 is includes ACL 562, drop comments 570 includes ACL 577, user friends 580 includes ACL 588, user requests 590 includes ACL 598, and drop share 5000 includes ACL 5016.

Application identifier 512, application name 513, and application version 514 are identifier values associated with an installation of a messaging module, and may be used for system management and updates to a messaging module. Badge 515 is a value that may be used for security and integrity verification of a messaging module. Channels 516 may be used to store information about channels in a communication system that may be used by a mobile device on which a messaging module installation may operate. Device token 517 and device type 518 may be associated with descriptions or details of a mobile device on which a messaging module is installed. Installation 519 and parse version 521 may provide identifiers for a particular installation session or version that was used to place a messaging module on a mobile device, and may be used for system troubleshooting. Owner 520 may be an identifier associated particularly with a mobile device on which a messaging module is placed, and may further be used for situations in which multiple user accounts or installations may be placed on a single mobile device. Createdate 523 and updatedate 524 may store timing details associated with placement of a messaging module or update of a messaging module on a mobile device.

In various embodiments each of these element values may be stored as part of a system element structure either in a local data storage such as data storage 214 as part of messaging module 210, or they may be stored on a cloud server computer such as cloud server computer 240. In other embodiments, multiple copies of such elements may be stored in multiple locations.

User 530 illustrates aspects of a user record that may be generated upon the user registering with the system to be able to send location based communications as described above, for example, in methods 300 and 400. As shown in system 500, the example embodiment user 530 includes ID 531 which may be similar to ID 511. Username 532 may be a login username generated by a user to provide the user access to system. This may be part of a login used to gain access to a messaging module such as messaging module 210. Password 533 may similarly be a password selected by a user on registration as part of security and identity protection with location-based communications. Additional elements of user 530 may include details associated with the user's identity including authorization data 534, email verification 535, birthday 536, first name 537, last name 538, normalized first name 539, normalized last name 540, email 541, and phone 542. In other embodiments, additional information about a user, a user's contacts, and other profile information may be stored as part of a user 530 system element. Additionally, user 530 elements may store location preferences for a user. For example, as described in more detail below with respect to FIG. 15, a system record such as user 530 may include record elements for multiple locations. Each location stored in the user record may have a location 543 elements used to identify the location as well as associated latitude 544 and longitude 545 elements that identify coordinates for the physical location associated with location 543 elements. Created at element 546 and updated at element 547 may store information identifying a date and time when a user 530 element was initially generated and when any element value of user 530 was updated.

Drop 550 is a system element associated with a particular location based message. Each location based message sent via a communication system using system 500 includes a drop 550 element. An instance of drop 550 may, for example, be generated using method 300 described above. ID 551 elements comprise an identifier associated with the user, and user 552 elements include additional information identifying a user that generates the location based message associated with drop 550. Message 553 elements are element values that store text or other portions of a content message that are part of a location based message. Image data 554 may be a separate record for a portion of the content message that includes picture images or video images as part of a content message in a location based communication. Friend list 555 may include a recipient or a set of recipients targeted as recipients of a location based communication associated with drop 550. Radius 556, location 557, latitude 558, and longitude 559 are each aspects or details of a delivery area associated with a location based message as described herein. Thus, as described above, when a user generates a location based message, a messaging module may automatically generate a drop 550 element. This may automatically include the generating a message ID value in ID 551 as well as a sender ID in user 512. The user will also identify a recipient from a friends list using the friend list 555. The user will input a message that will be stored in a message 553 element, an image data 554 element, or both. The user will also input a geofence input that generates information that may be stored or selected from location 557, or radius 556, latitude 558, and longitude 559. Each of these element values is received via an input device of a mobile device, and passed to a messaging module for storage as part of a location based message data record. In certain embodiments, the geofencing input may include combination of a selection of a previously known location as well as user input radius or coordinate information. All of this information may be aggregated in a drop 550 element as part of a location based communication. Additionally, in certain embodiments, drop 550 elements may store a date and time of creation of the message in created at 560. In certain embodiments, a location based message may be updated either before or after it is "found" by a recipient. When a location-based message is updated by a sender, updated at 561 element may store data in times of updates as well as details of changes to the location based message of a particular instance of drop 550.

Drop comments 570 is an example of an implementation of location based communications that uses a record for social comments to be stored and shared about previously sent location based messages. Each instance of a drop comment 570 may have a unique ID 571. Each drop comment 570 may also include the details of a comment in the comment 572, which may be similar to a content message described herein such as a text message, an image, or a video. Drop 573 may include an identifier which details which drop 550 is associated with a particular drop comment 570. For example, drop 573 may include an ID from an ID 551 element of the particular drop 550 location based message. Drop comments 570 includes a user 574 element which identifies a user that generates a drop comment 570. Drop comments 570 additionally includes created at 575 and updated at 576 elements for recording details of creation and update times and details.

User friends 580 includes an identifier 581 which may be a unique value for each instance of user friends 580. Friends user 582 may include a list of contacts for a user identified by user 583 elements which identifies the user associated with the user friends 580 instance. User friends 580 elements may have additional details about the connection between users or about either user individually including details about the activity state of either user in is active 584. User friends 580 elements may also include details about which user initiated the connection associated with user friends 580 in use user initiated 585, as well as details about when the connection was established or updated in created at 586 and updated at 587.

Figure 13:
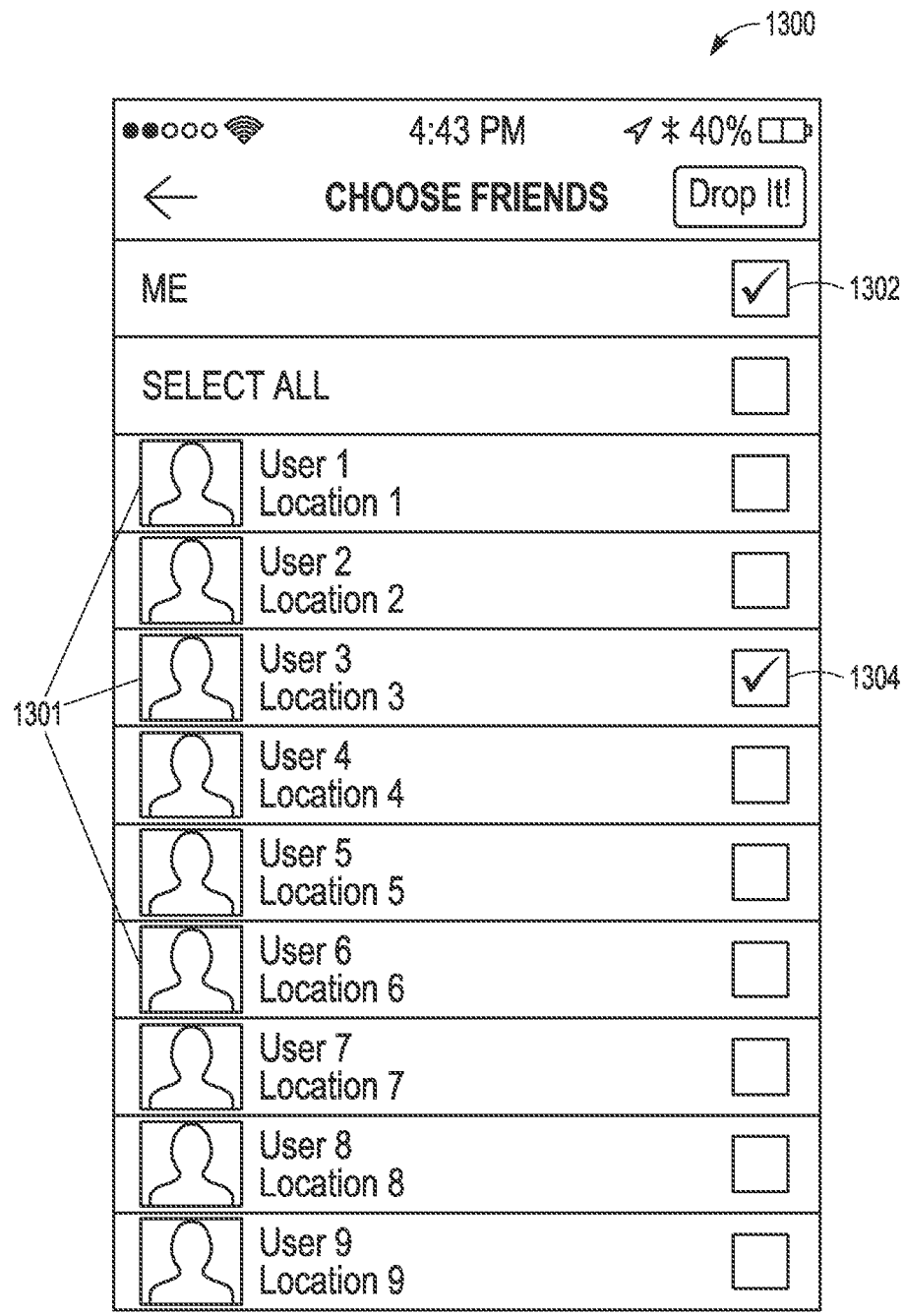
FIG. 13 illustrates aspects of a user interface for location based messaging according to certain example embodiments.

User request 590 elements illustrate an implementation of system records in certain embodiments that are associated with user initiated requests for connections to other users. Examples of such requests are described in more detail below with respect to FIGS. 13 and 19. The embodiment described in system 500 of user requests 590 includes an ID 591 for each user requests instance, a user 592 element that identifies a user that initiates a connection request, a user request 593 element identifying the target or recipient of the user request, request email 594 element detailing connection information about users, a status 595 that may detail whether a request has been accepted or not, and created at 596 and updated at 597 elements detailing when a user request 590 was initiated or updated.

Drop share 5000 illustrates aspects of an embodiments where a recipient of a location-based message may "share" a found location based message. In such embodiments, when a location based message is presented to a recipient, the recipient may use an interface element to relay the location based message to additional users. Drop share 5000 is thus similar to drop 550, but is for a location based message that was previously generated, and is being shared by a recipient of the previously generated location-based message. ID 5001 is an identifier element for each instance of a drop share 5000 element. Created by 5002 provides information about the recipient that is sharing the received location based message. Drop 5003, drop status 5004, drop updated on 5005, drop name 5006, and other elements 5007 through 5015 include details about the previously created location-based message that is being shared by the recipient user as well as some details about the originally generating user, the sharing user, and details about the location based message status related to the users.

While system 500 illustrates one implementation of aspects of location based communications, in various other embodiments, additional combinations of elements, different structural elements, or different element values may be used as part of a system for location based communications.

Figure 6:
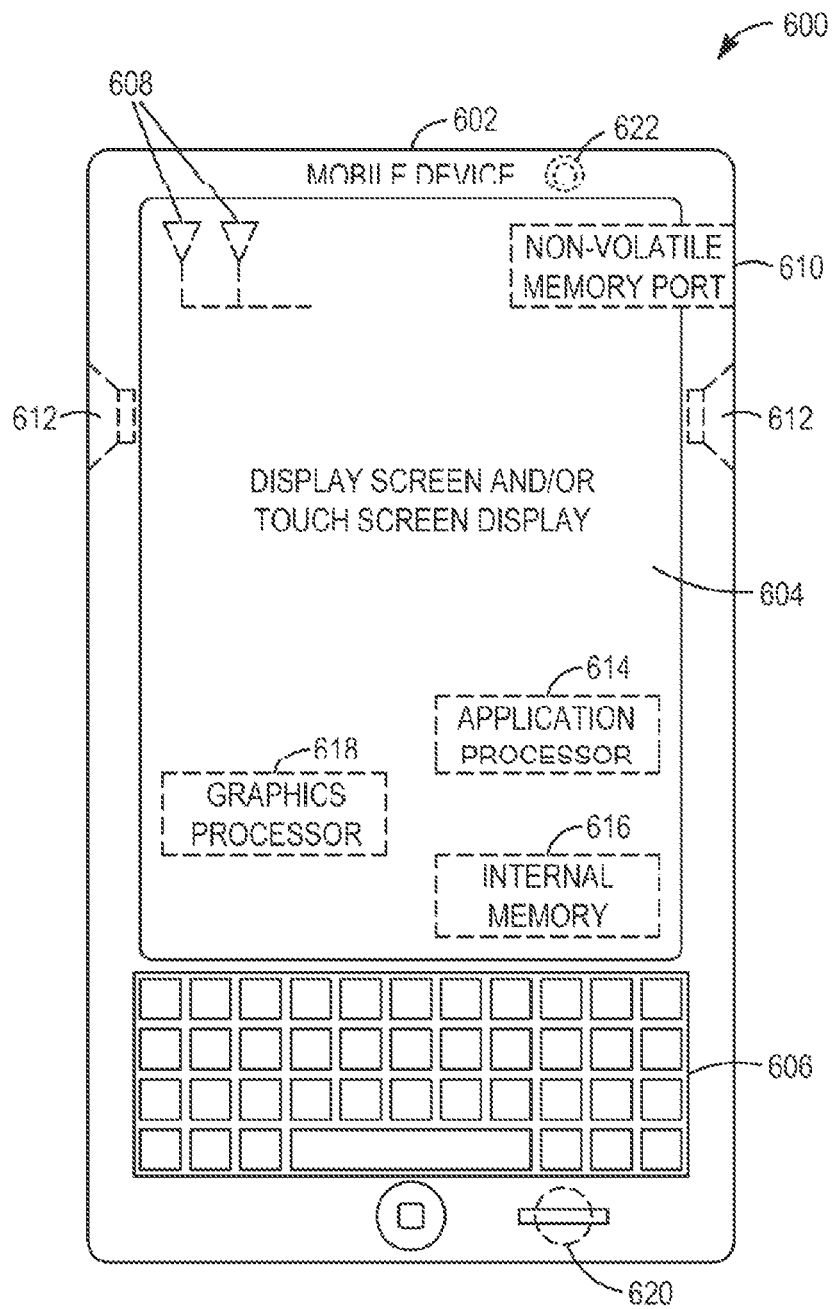
FIG. 6 illustrates one implementation of a mobile device that may be used with certain example embodiments.

FIG. 6 illustrates on example of a mobile device 600. Any mobile device described herein may be implemented as an embodiment of mobile device 600. For example first mobile device 110 and second mobile device 120 may be similar to mobile device 600. The mobile device 600 can be used as an implementation of any mobile device described herein and can also be any mobile device, a mobile station (MS), a mobile wireless device, a mobile communication device, a tablet, a handset, or other type of mobile wireless computing device. The mobile device 600 can include one or more antennas 608 within housing 602 that are configured to communicate with a hotspot, base station (BS), or other type of wireless local area network (WLAN) or wireless wide area network (WWAN) access point. Mobile device 600 may thus communicate with a WAN such as the Internet via a base station transceiver such as communication node 130 described above. Mobile device 600 can be configured to communicate using multiple wireless communication standards, including standards selected from 3GPP LTE, WiMAX, High Speed Packet Access (HSPA), Bluetooth, and Wi-Fi standard definitions. The mobile device 600 can communicate using separate antennas for each wireless communication standard or shared antennas for multiple wireless communication standards. The mobile device 600 can communicate in a WLAN, a WPAN, and/or a WWAN.

FIG. 6 also shows a microphone 620 and one or more speakers 612 that can be used for audio input and output from the mobile device 600. A display screen 604 can be a liquid crystal display (LCD) screen, or other type of display screen such as an organic light emitting diode (OLED) display. The display screen 604 can be configured as a touch screen. The touch screen can use capacitive, resistive, or another type of touch screen technology. An application processor 614 and a graphics processor 618 can be coupled to internal memory 616 to provide processing and display capabilities. A non-volatile memory port 610 can also be used to provide data input/output options to a user. The non-volatile memory port 610 can also be used to expand the memory capabilities of the mobile device 600. A keyboard 606 can be integrated with the mobile device 600 or wirelessly connected to the mobile device 600 to provide additional user input. A virtual keyboard can also be provided using the touch screen 604. A camera 622 located on the front (display screen) side or the rear side of the mobile device 600 can also be integrated into the housing 602 of the mobile device 600. Any such elements may be used to generate information that may be communicated as content in a location based communication described herein.

While certain example devices are described herein, it will be understood that various embodiments can be used on all mobile technology platforms, as well as wearable devices, and may be implemented using any combination of hardware/and or software. Further, in addition to being implemented using a mobile technology platform and wearable devices, the various embodiments described herein are not limited as such. For example, the certain embodiments may be hard-wired in an automobile or any other like implementation. Further, rather than being implemented on a mobile device, various embodiments may be also be implemented using stand-alone hardware and/or software. Additionally, certain embodiments may be implemented as computer readable instructions stored within non-transitory computer readable media. This includes any non-transitory memory described herein.

FIGS. 7-21 then illustrate display outputs that are part of various aspects of certain embodiments of location based communications described herein. For illustrative purposes, certain embodiments are described with respect to the interfaces and images of these figures. It will be apparent other embodiments are possible within the scope of the innovations presented herein.

Figure 7:
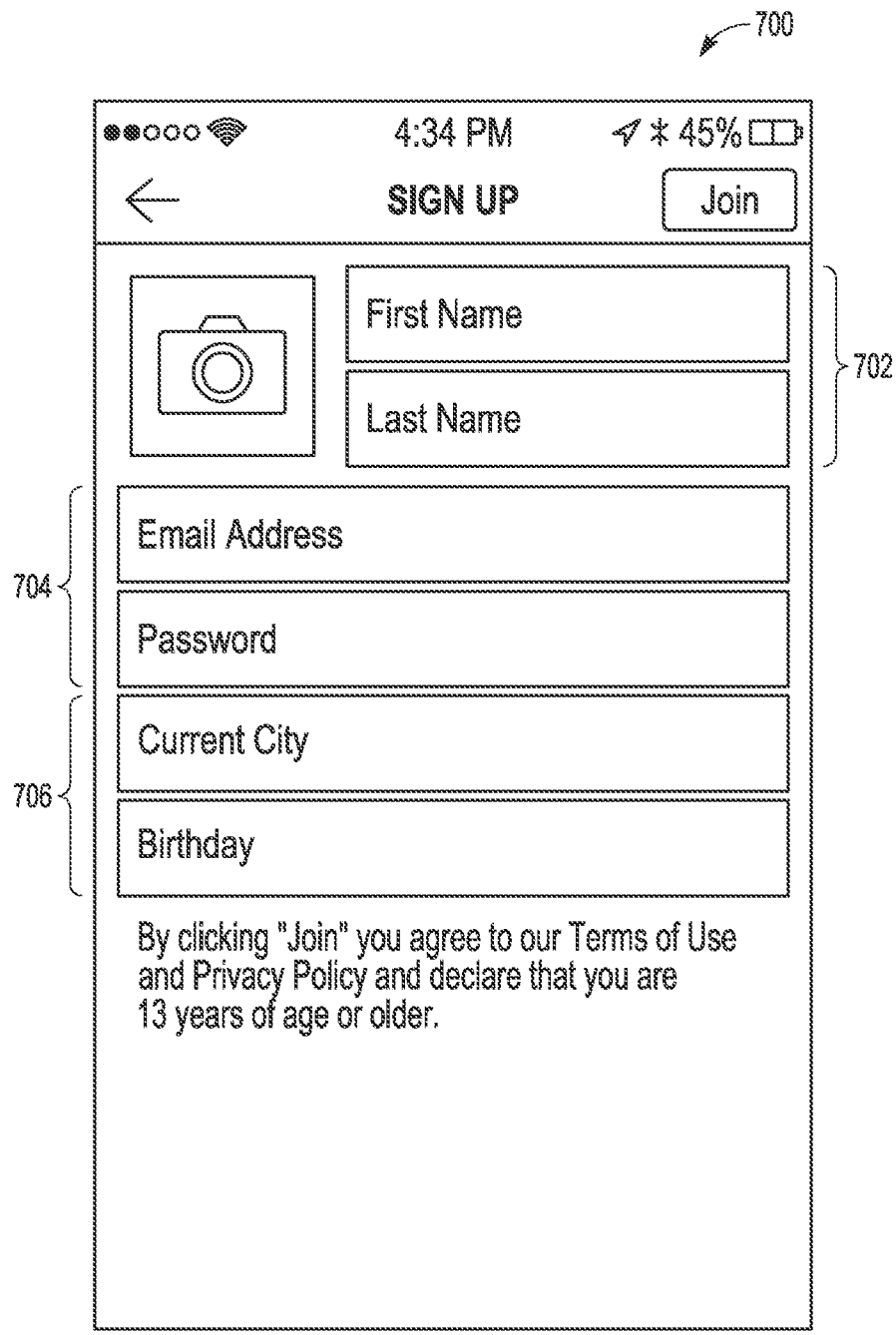
FIG. 7 illustrates aspects of a user interface for location based messaging according to certain example embodiments.

In certain embodiments, when a user first downloads the a messaging module such as messaging module 210 to a user's mobile device, the user will be required to setup an account. FIG. 7 depicts user interface 700 of an initial sign-up screen when a user creates an account according to one embodiment. Such account generation may be performed using a messaging module communicating with a cloud server computer. As shown, a user is prompted to enter their first and last name as entry 702 on an input device of a mobile device. Additional information may be entered as entries 706. Such entries may include current city, which may be configured to populate automatically, as well as and birthday. Other such entries 706 may also be includes such as a profile picture. Additionally, in one embodiment account creation involves selection of login information 704 which will allow the user to access the account via a messaging module from any applicable device. In certain embodiments, certain elements of this information may also be used as an identifier for generating a location based communication. For example, a first or last name or an e-mail address may be used by senders to select a particular user as a recipient of a location based communication. In other embodiments, other values, such as a phone number, a third part account identifier, a user generated image or picture, a photograph, or a user generated name may be used as identifiers.

In certain embodiments, users have the ability to add saved addresses to his or her profile for other users to view in order to optimize the process of sending and receiving messages. One embodiment of this may be storing a location within location 543 as described above for implementations using system 500. These saved locations can be any location such as a home, work, favorite bar, nearest airport, or any other such location, and users are able to designate and save locations they will be visiting in the future (e.g. vacation destinations, football game, etc.). Once a user adds an upcoming location in his or her profile via a mobile device UI such as UI 700, the user's profile will appear as updated at the top of his or her contact's friend screens in order to allow efficient message creation with minimal clicks. In certain implementations, such information may be sent to data storage modules or location manager modules of messaging modules for use in generating geofence inputs to identify delivery areas for messages. Users can control which other users have access to saved addresses via system settings.

In addition to the inclusion of addresses, in certain embodiments, a registration process may allow a user to determine different types and sources of location based communications that the user wants to receive on their account. For example, a user may select individuals that they wish to receive location based messages from, either as part of registration or in response to a request from the other user, as described above and below. Additionally, a user may wish to subscribe to curated groups, or to location based message groups, where location based messages will be propagated to any user that has opted into the group.

For example, one embodiment may involve receiving, at a cloud server computer from a first mobile device, a first add group request, wherein the message acceptance communication is associated with a location based message group; receiving, at the cloud server computer from a third mobile device, a location based message directed to the location based message group; communicating, from the cloud server computer to the first mobile device, the location based message in response to a determination that the second mobile device is associated with the location based message group. Subsequent messages from third and fourth devices received at the server that are directed to the location based message group will be directed to the first device. Similarly, a mobile device may receive a user input including an identifier associated with a location based message group, communicate an add group request using the identifier to a cloud server computer, and then received location based messages in response to communication of the add group request to the cloud server computer. Location based messages may be delivered from the location based server to the first mobile device as part of group messages in any manner described herein, including message delivery upon the device "finding" the message, location or delivery area information delivered without the content message until the device is within the delivery area, or full message delivery stored on the device prior to the device being within the delivery area, with the message not being available in a "found" message UI of a messaging module until the device is within the delivery area.

Such group messaging may be integrated with any other embodiment described herein as a messaging option, both for location based message transmission, and for receipt of location based messages.

Figure 8:
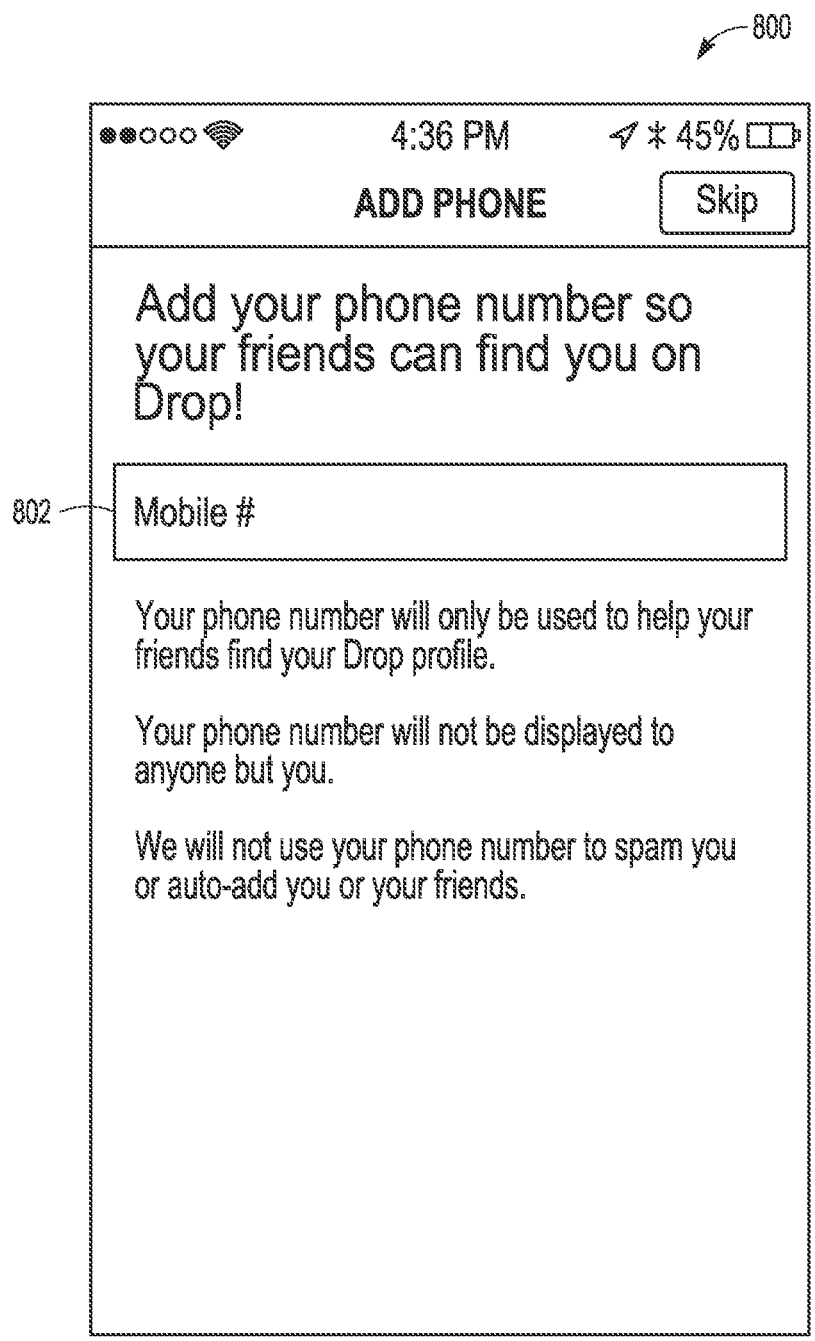
FIG. 8 illustrates aspects of a user interface for location based messaging according to certain example embodiments.
Figure 9:
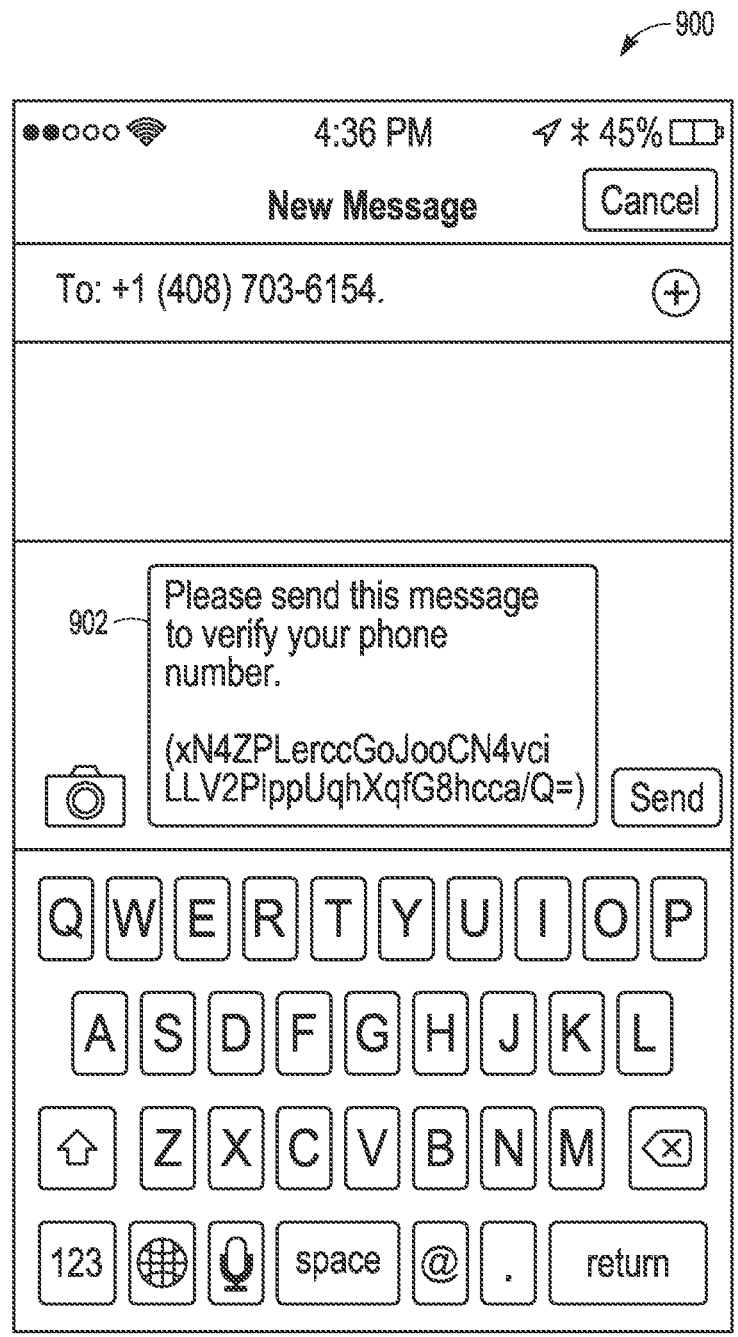
FIG. 9 illustrates aspects of a user interface for location based messaging according to certain example embodiments.

In one embodiment, registration may additionally involve user interface 800 of FIG. 8 where a user is asked to input their phone number 802 which enhances the user's ability to be found by other contacts using the system. If a user opts-into submitting their phone number, the messaging module or other module involved in registration may to auto-generate a text message the user needs to send in order to authenticate the phone number. User interface 900 of FIG. 9 illustrates an example of an auto-generated message 902 that may be used for authentication of a phone number by a system.

Figure 10:
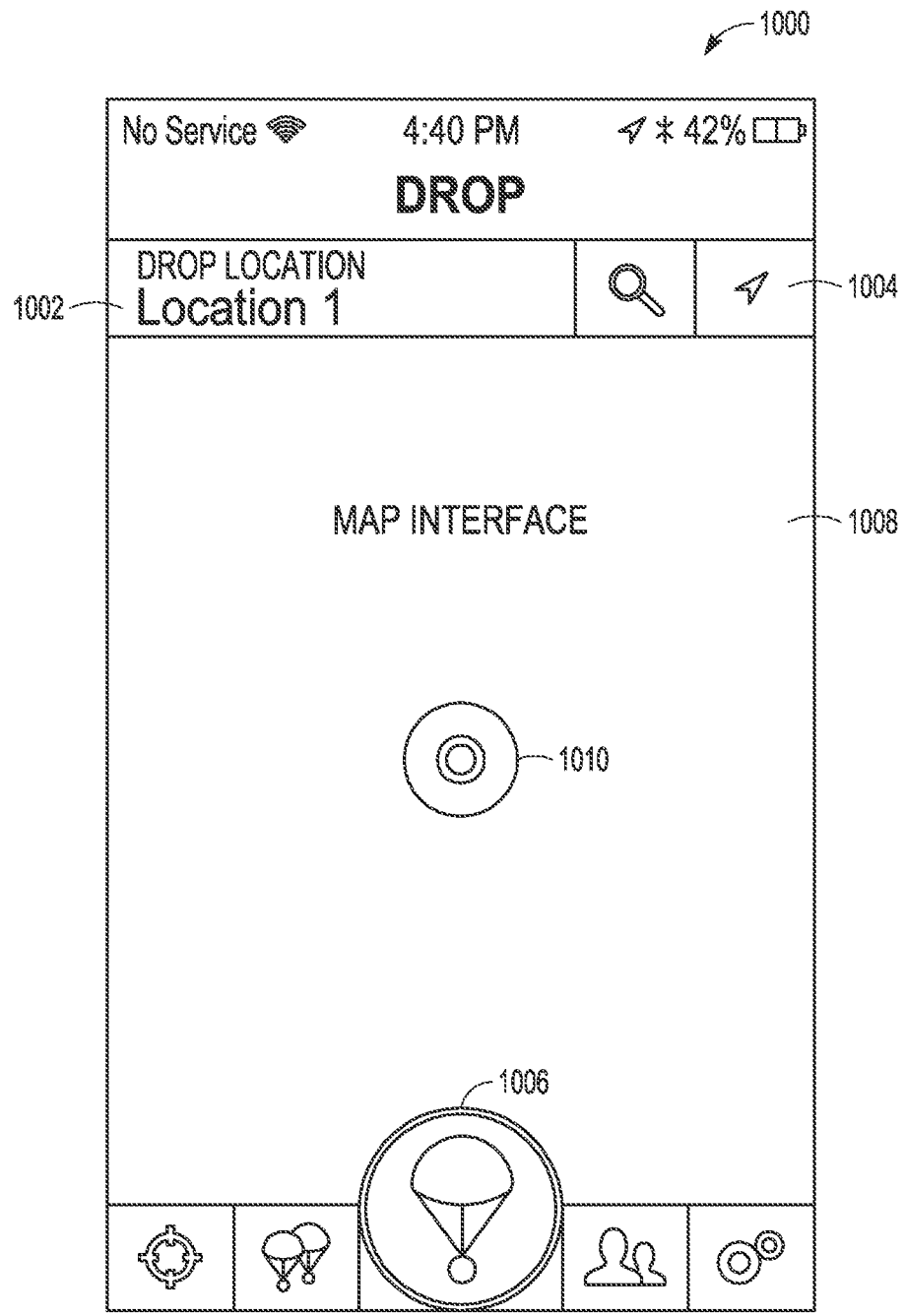
FIG. 10 illustrates aspects of a user interface for location based messaging according to certain example embodiments.

Once a user has signed-up for an account, they will have the ability to leave messages and content using location based messages. FIG. 10 then illustrates on example interface 1000 including a user's map screen displaying a map 1008 and a center element 1006. Using interface 1000, a user can either search for an address 1002 to leave a message. Alternatively, a user may use an input 1004 to center the map on his or her current location 1010. Additionally, a user can drag and pinch the map to manually select a location using map information within a messaging module or an associated map module. In one embodiment, interface 1000 may enable users to move between the various tabs by swiping the screen in the designated direction. Swipes from the map screen may, in certain embodiments, be on the bottom of the screen in order to avoid interfering with the map interface.

Figure 11:
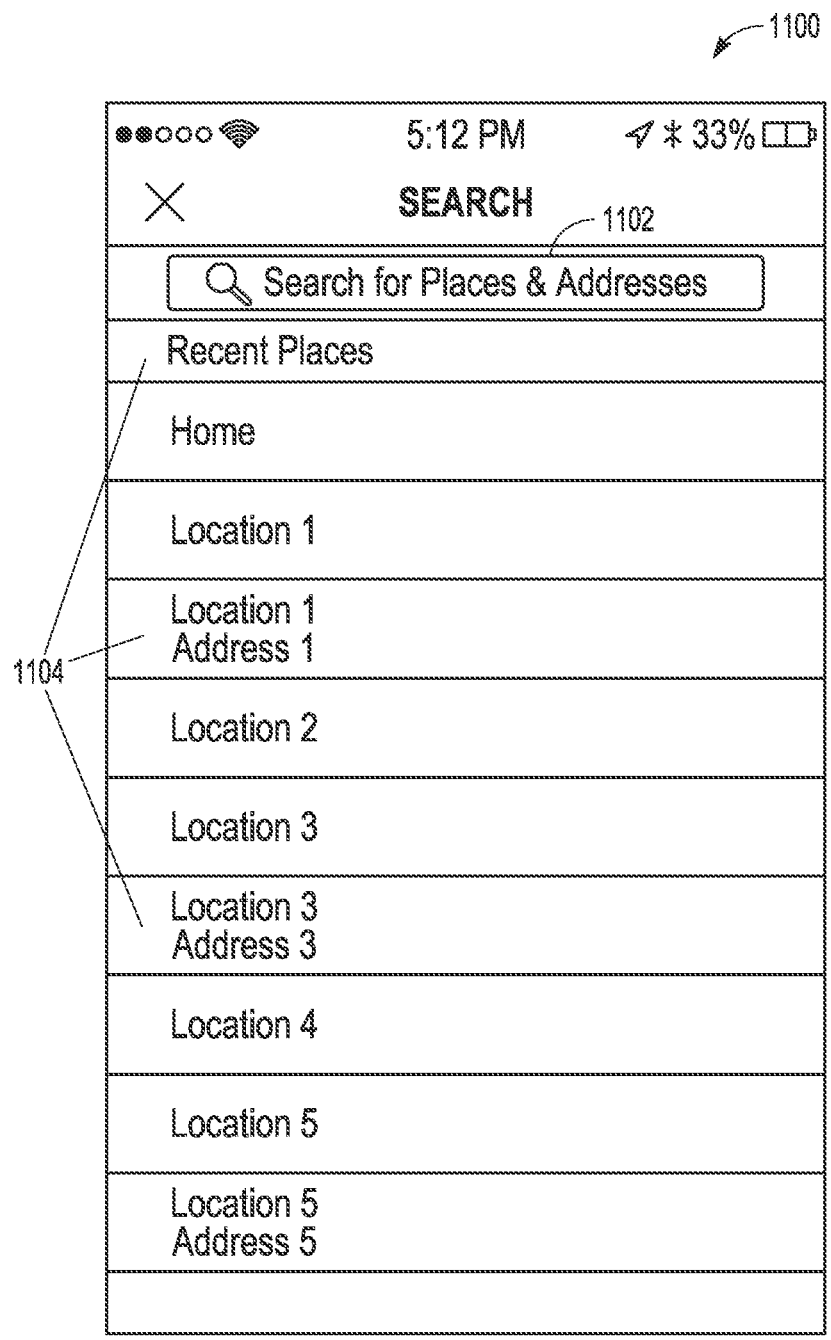
FIG. 11 illustrates aspects of a user interface for location based messaging according to certain example embodiments.

User interface 1100 of FIG. 11 illustrates a search interface. From this interface, a user has the ability to search for specific locations anywhere in the world using search 1102 or to select previously used locations 1104. Alternatively, a user is able to select addresses directly from the intended recipient's profile if the selected recipient has saved locations. Once a user has selected a location the user can mark the location by selecting the center element 1006. Holding the center element 1006 will either allow the user to quickly save the highlighted location or to define the message delivery radius with a visual indicator on the map as part of a geofence input.

Figure 12:
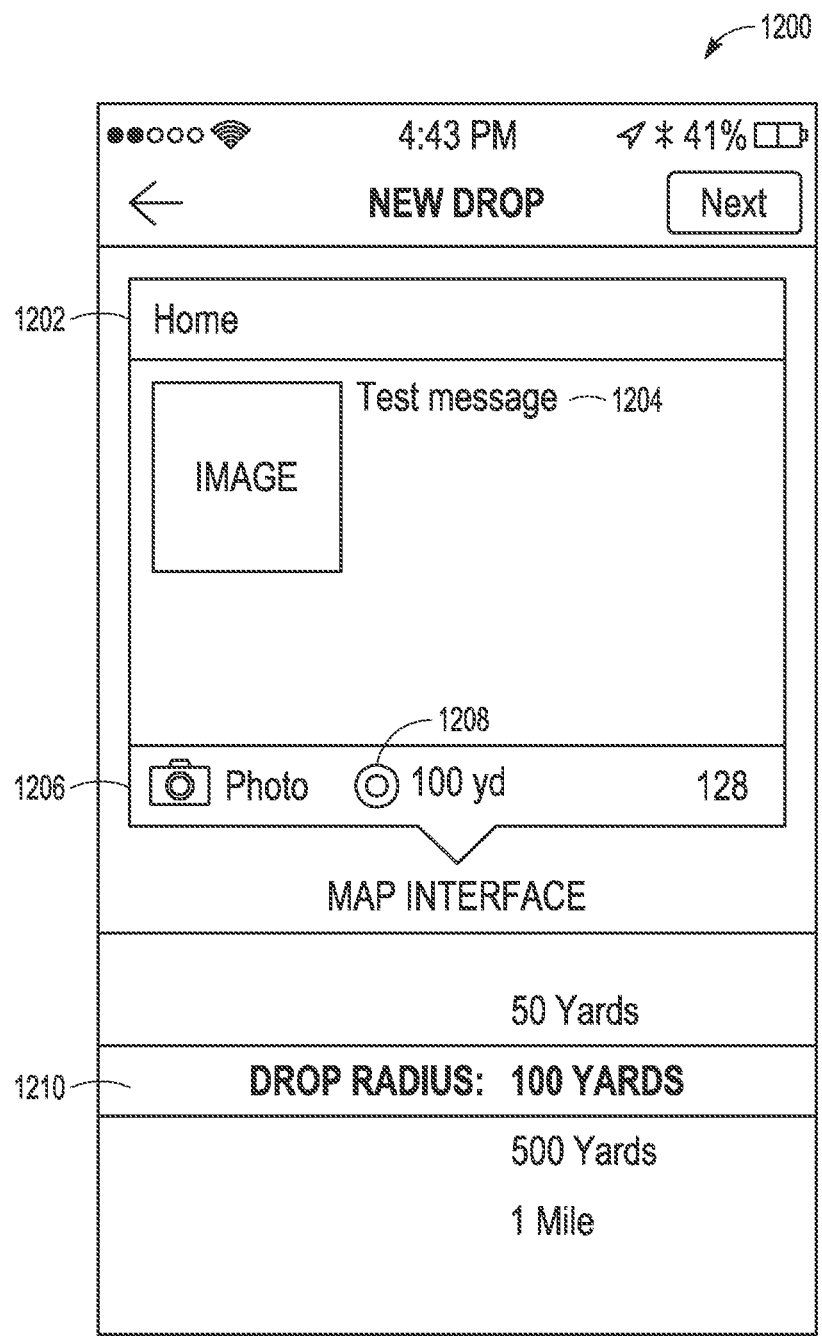
FIG. 12 illustrates aspects of a user interface for location based messaging according to certain example embodiments.

In the embodiments described in FIGS. 7-20, once the center element 1006 is selected then user interface 1200, shown in FIG. 12, will be displayed. Here user inputs to an input device of a mobile device can modify the name 1202 of the delivery area identified by the selected geofence, add text or other data to the content message 1204 as well as include a picture, video or other custom content 1206. Users are able to input commands via UI 1200 to a mobile device to update or edit content messages and edit, draw and add text to pictures and videos as part of a location based communication using custom content 1206. In addition to user-generated content, various embodiments may include pre-populated pictures and content that users may include in messages.

The embodiment of user interface 1200 includes a boundary adjustment input 1208. In certain embodiments, after selecting a location as described above, users have the ability to select the delivery radius 1210 with a visual indicator for which the delivery of the message will be triggered once a selected recipient is in range.

User interface 1300 illustrates an embodiment where a messaging module is configured to allow users have the ability to select one or multiple recipients 1301 using a recipient selection checkbox 1304 in addition to having the option to leave messages for themselves with a self-selection checkbox 1302. In certain embodiments, this includes the ability for a sender of the message to stipulate whether to leave the message at every type of a certain location (e.g. every Starbucks identified by map data that the messaging module has access to, at each of the selected recipients specific homes, etcetera). The sender is also able to state whether the message expires after a specified period of time either before or after opening. In certain embodiments, in the event an intended recipient is not registered with the system, the messaging module includes a configuration to allow a user have the ability to include an unregistered recipient on messages, at which point the unregistered recipient will receive either an SMS or email indicating he or she has received a message from the user at the selected location. A messaging module may also include a configuration option to leave messages to followers as well as to the broader public. In certain embodiments, public messages will only be received by users that have opted-into receiving public content.

Figure 14:
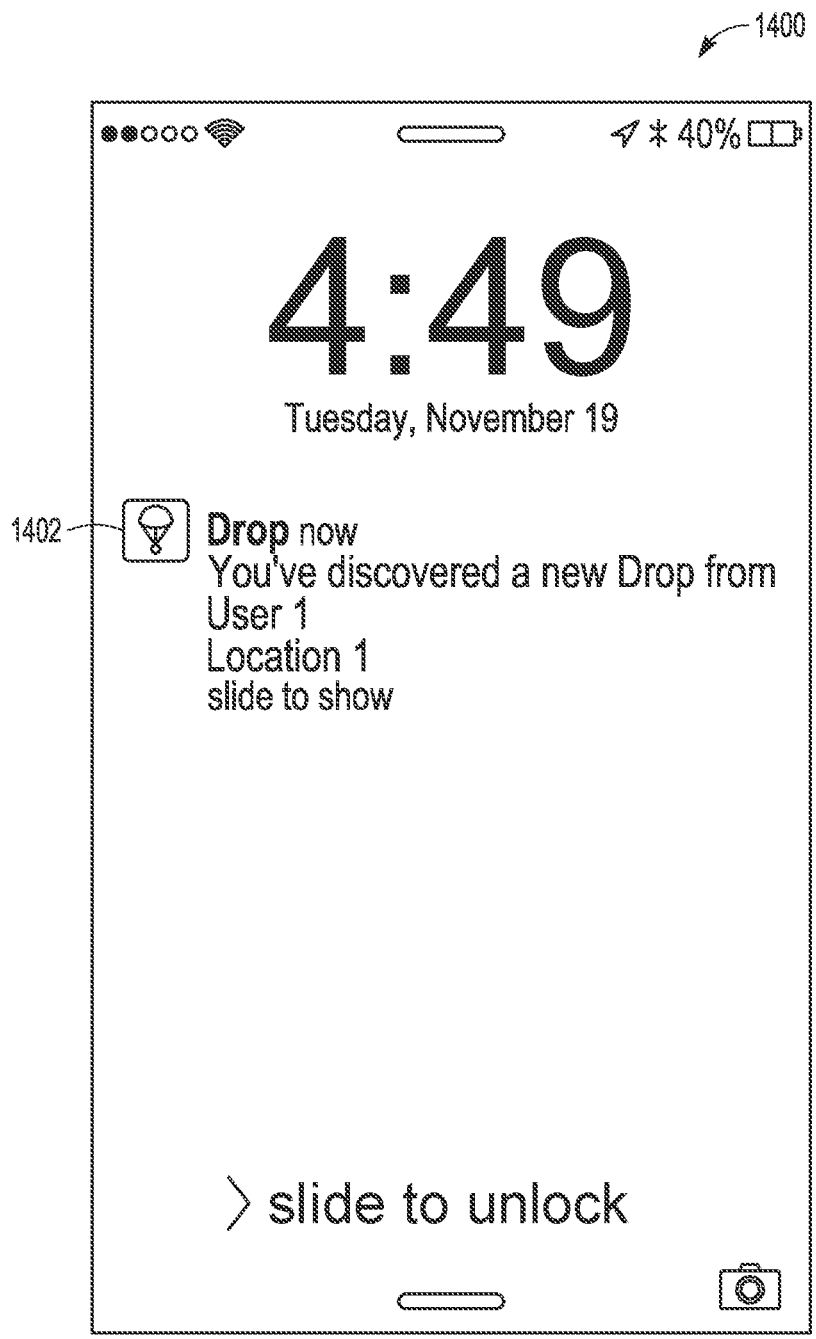
FIG. 14 illustrates aspects of a user interface for location based messaging according to certain example embodiments.

User interface 1400 of FIG. 14 illustrates push notification 1402 which may be used in certain embodiments. As described above, in certain embodiments, once a user is in the delivery radius of a message that has been left for the user, the user will receive a push notification from a cloud server computer. Such a push notification 1402 may have data indicating both the sender of the content in addition to the location, geofence, or delivery area associated with the content. Messages may also be left for users that are delivered on a time limited basis. If the sender sends a time-based message to a recipient, the recipient will receive a pin on his or her map wherever the user is when the content delivery time is met. The pin indicator in a recipient mobile device's map UI may appear when a sender selected time period begins, and may disappear when the sender selected time period ends. Push notification 1402 may include details on a time limit for the message in certain embodiments.

Figure 15:
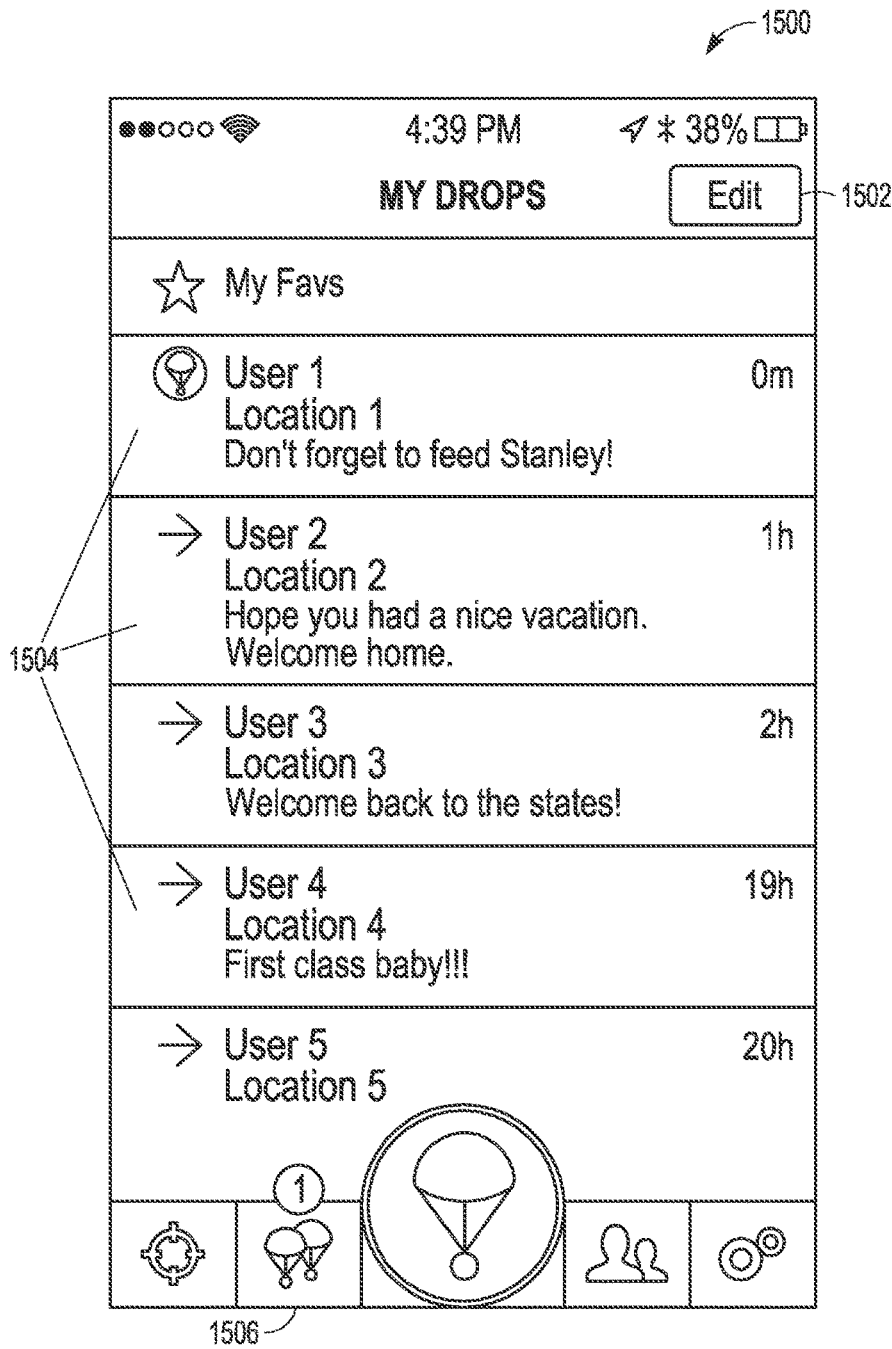
FIG. 15 illustrates aspects of a user interface for location based messaging according to certain example embodiments.

User interface 1500 of FIG. 15 illustrates one embodiment of a messaging module user interface that may be displayed when a user opens the messaging module on the user's device after receiving the notification such as push notification 1402. In such an embodiment, the user will be taken to the log screen where the user will be able to see new messages 1504. New messages may be presented in bold or emphasized formatting. A messaging module may utilize separate colors and symbols to differentiate between sent and received messages in addition to indicating which messages have been responded to. Additionally, messages sent from a location where the sender is currently located, as opposed to a remote location, may appear as a different icon on the map. New actions may be presented on user interface 1500 by a badge number on a lower tab. A message module may be configurable to enable users may sort and filter messages by time, location, sender and receiver amongst other metrics. User interface 1500 includes an edit element 1502 to quickly remove log entries. In other embodiments, such an input may be performed by either swiping left as an input or selecting the edit element 1502.

Figure 16:
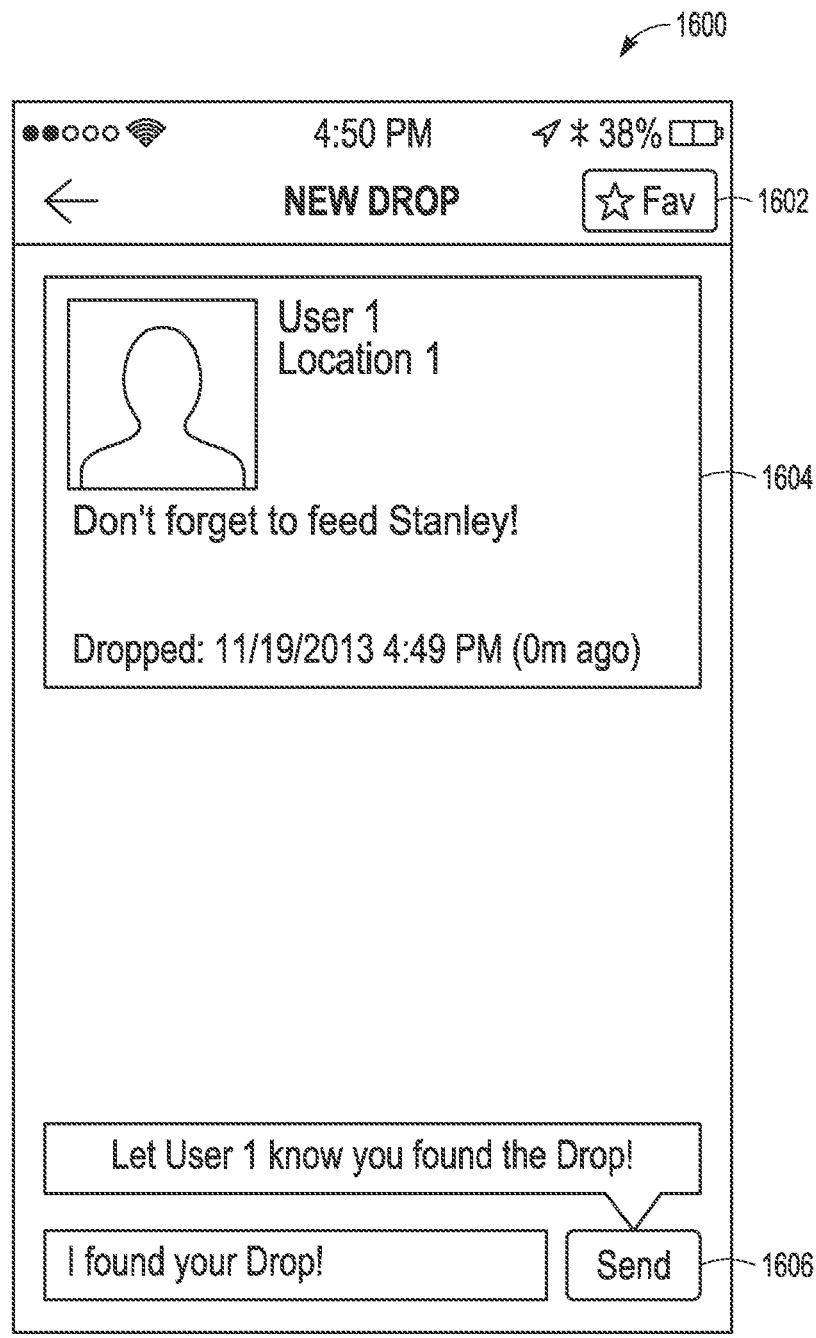
FIG. 16 illustrates aspects of a user interface for location based messaging according to certain example embodiments.

User interface 1600 of FIG. 16 illustrates a screen where the user has the ability to see the full message and content message 1604. This includes text content, image content, and video content. In certain embodiments, an interface may also enable output of other content such as audio content. From here, a messaging module may be configured for a user to reply to the message using reply element 1606 which will send a notification to the sender and as well as show up in the sender's log illustrated by user interface 1500. The reply element 1606 may be associated with a pre-populated reply. The messaging module may also be configured with ability to customize the response at the user's choosing. Once the sender of a message receives a response, the messaging module of the sender's device may be configured with the ability to continue the conversation with the message recipient. For messages sent to more than one recipient, messaging modules may be configured such that users are able to choose whether they want to reply directly to the sender, or to all recipients. Messaging modules include interfaces such that users included in group messages can collaborate to modify and edit the original message content, and so that users have the ability to save messages to a favorites folder for easier access as well as the ability to save the message location to the user's saved locations area in the user's profile. As described above, this profile information may both be stored locally as well as shared with the messaging modules of other users.

Figure 17:
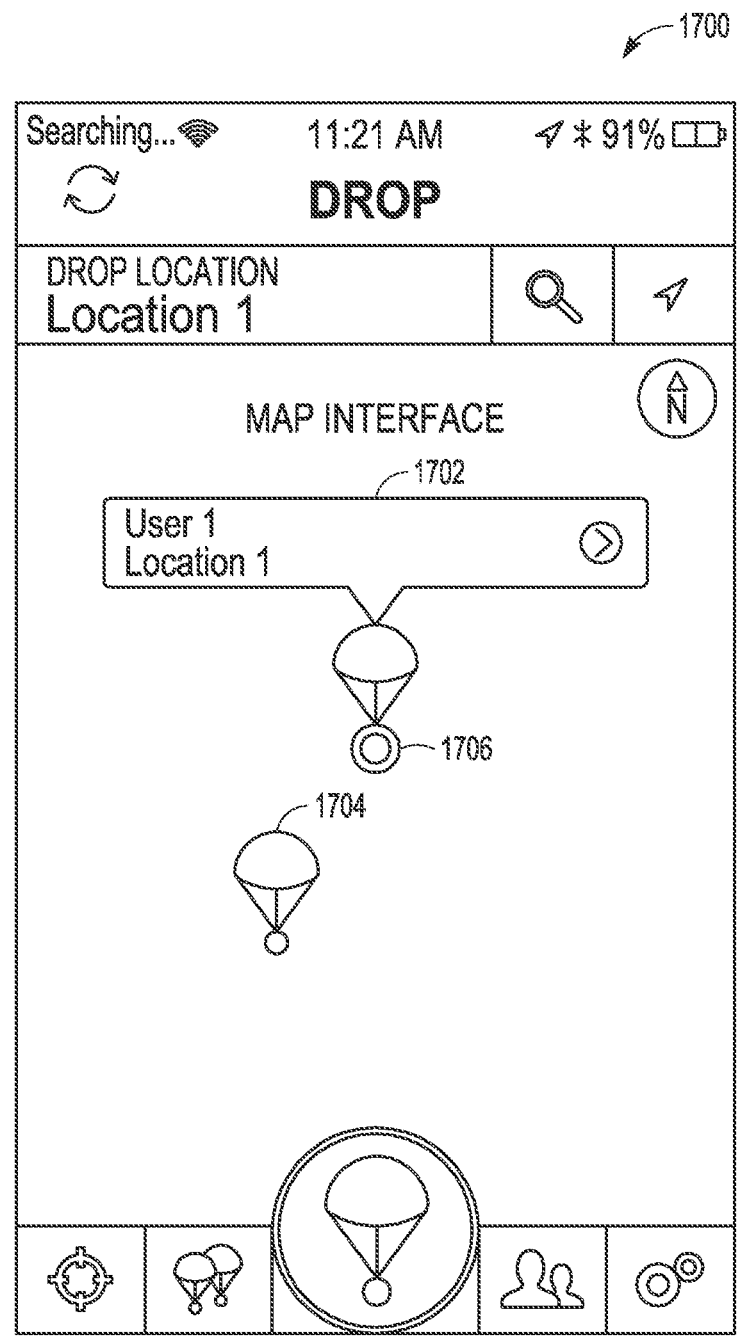
FIG. 17 illustrates aspects of a user interface for location based messaging according to certain example embodiments.

User interface 1700 of FIG. 17 illustrates an embodiment where a messaging module enables access to messages through a map display screen showing a user location 1706. In certain embodiments, icons on such a user interface 1700 are color-coded based on whether they were sent, such as message 1704 or received such as message 1702. In certain embodiments, new messages contain blinking icons. Selecting a specific icon pops-up the sender and location of the message 1702 and selecting the message again will take the user to a message interface. On the map screen, users can send a pulse in a pre-selected range that allows them to see how many messages are waiting for them in the selected vicinity.

Figure 18:
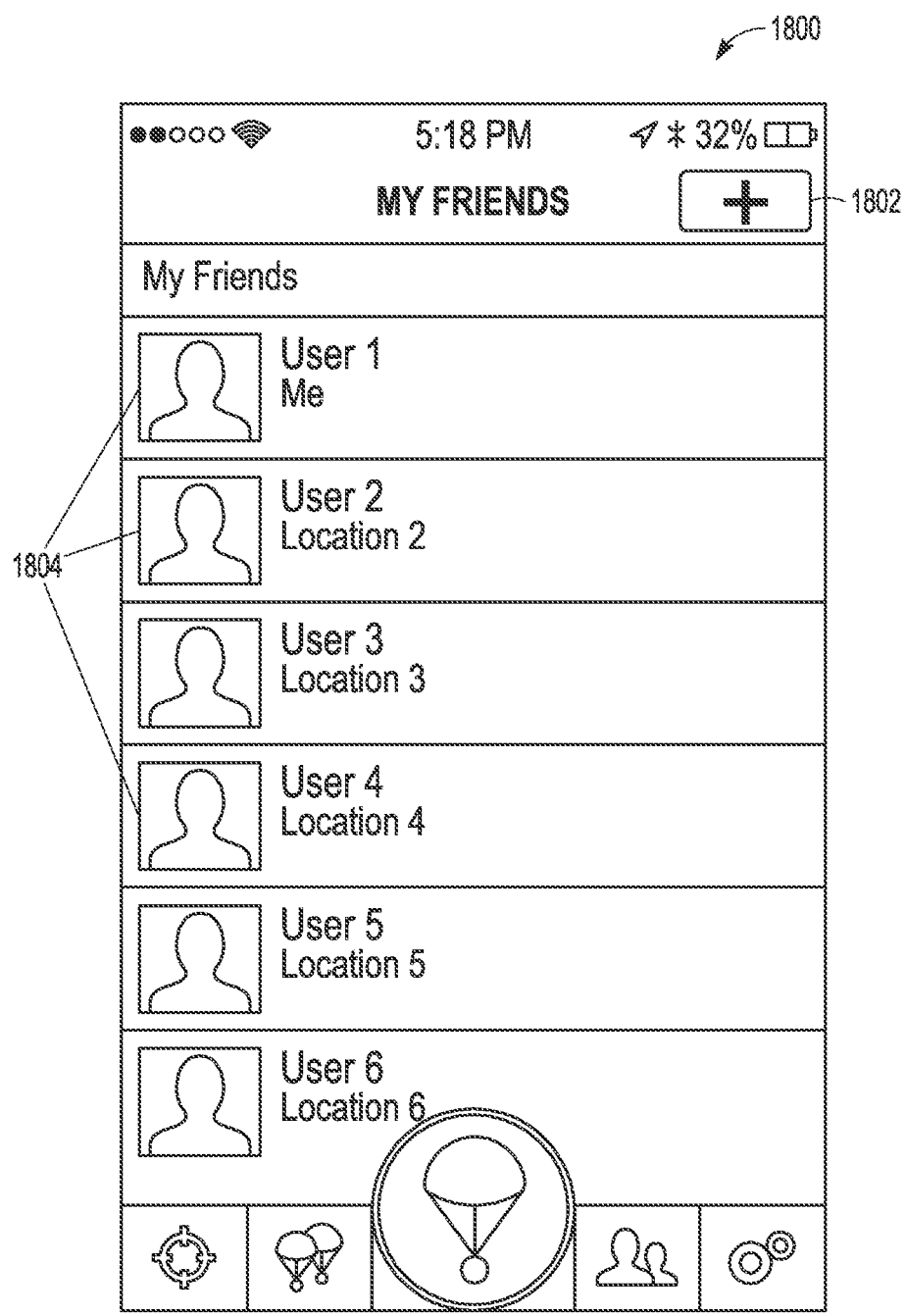
FIG. 18 illustrates aspects of a user interface for location based messaging according to certain example embodiments.

In certain embodiments, in order for a user to send and receive messages from specific individuals, the user must first add others users to the user's contact list. This may include embodiments where a user may initiate a message by sending an SMS text message or e-mail, but where the actual message may not be sent until the recipient of the SMS text message or e-mail joins the system and adds the sender to the recipients contact list. User interface 1800 of FIG. 18 illustrates one implementation of a contacts list, where a user can both see the user's existing contacts 1804 as well as an add new contact interface 1802. A messaging module may be configured such that users can create groups within the friends screen in order to simplify the message sending process. In such an embodiment, responses to messages left to groups will be visible by all members of the group even if certain group members are not "friends" on the messaging module.

Figure 19:
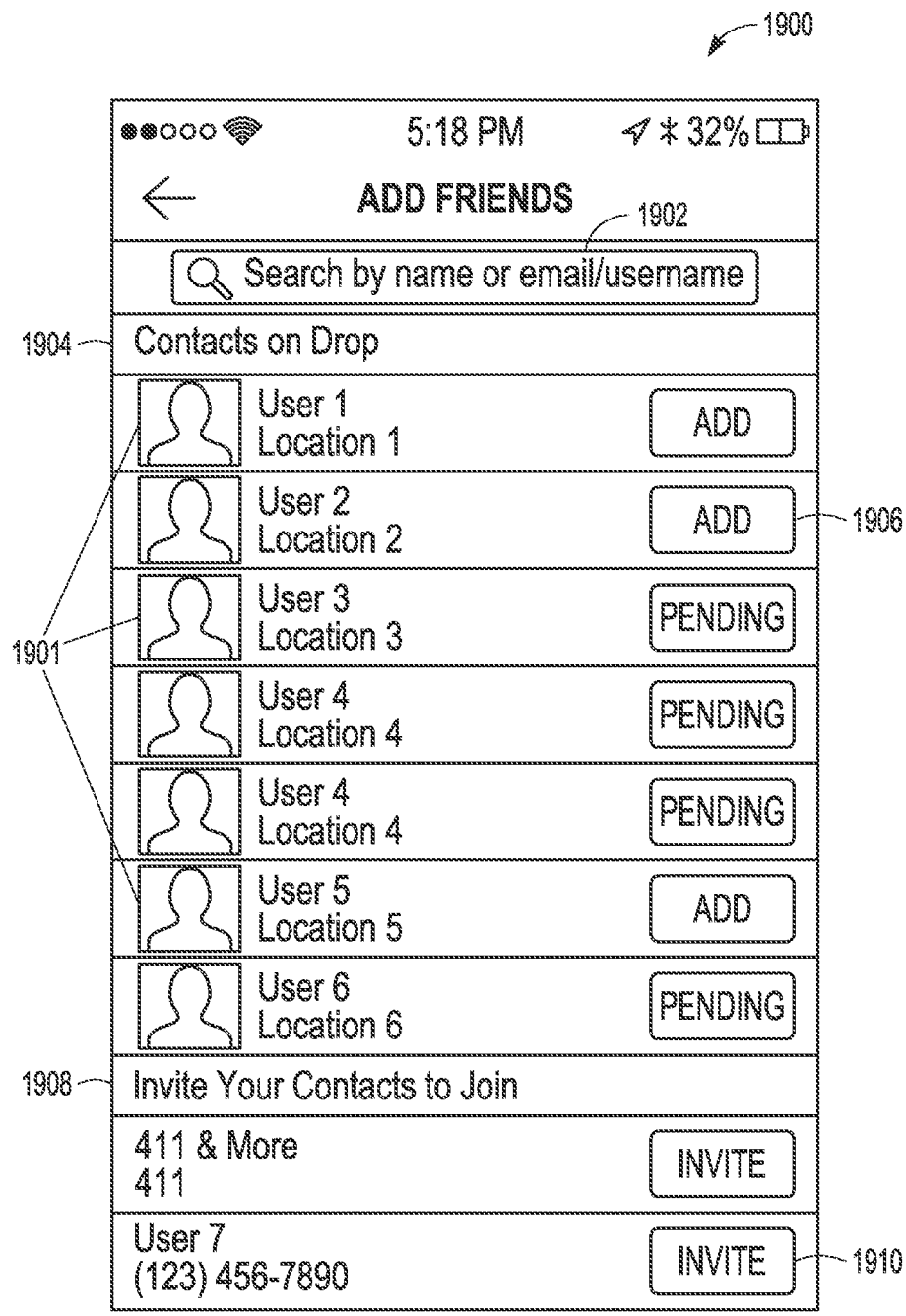
FIG. 19 illustrates aspects of a user interface for location based messaging according to certain example embodiments.
Figure 20:
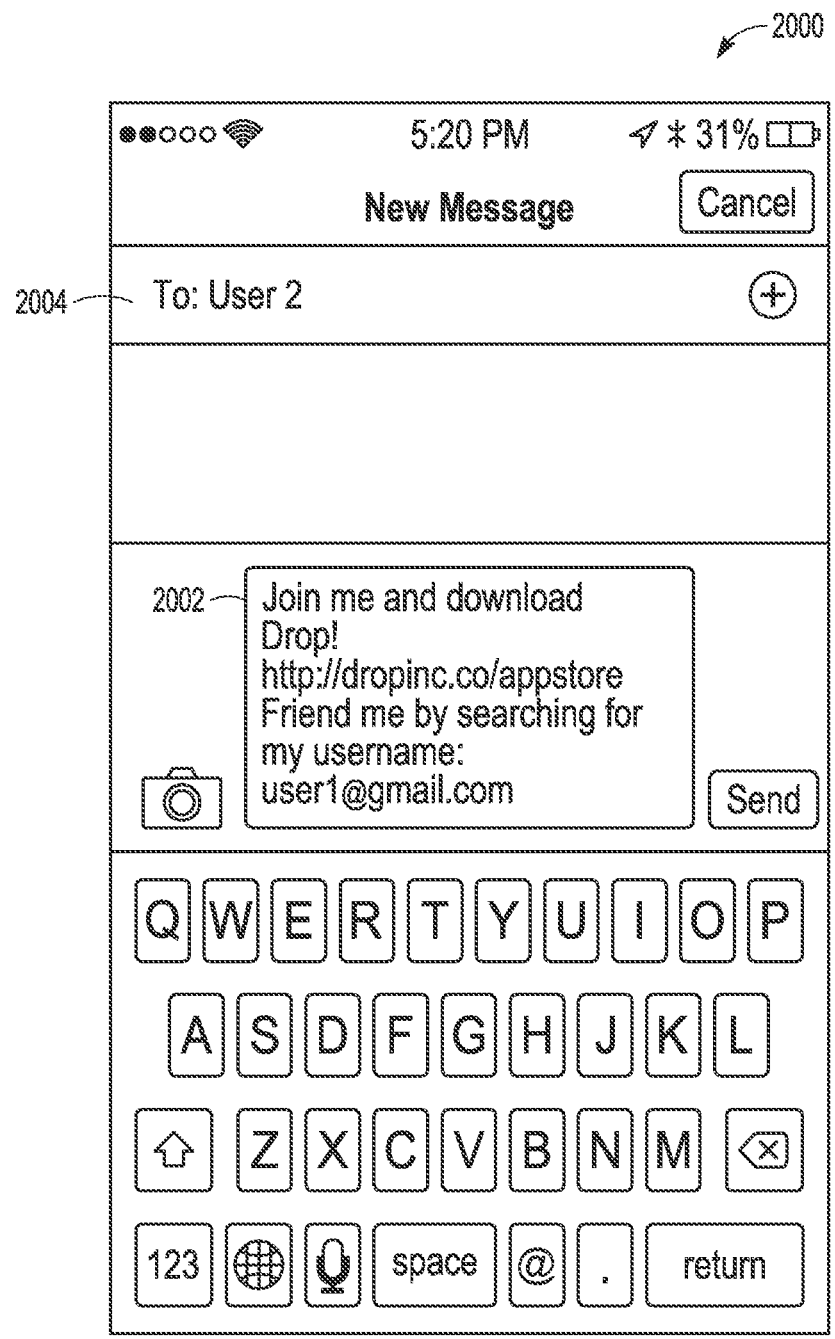
FIG. 20 illustrates aspects of a user interface for location based messaging according to certain example embodiments.
Figure 21:
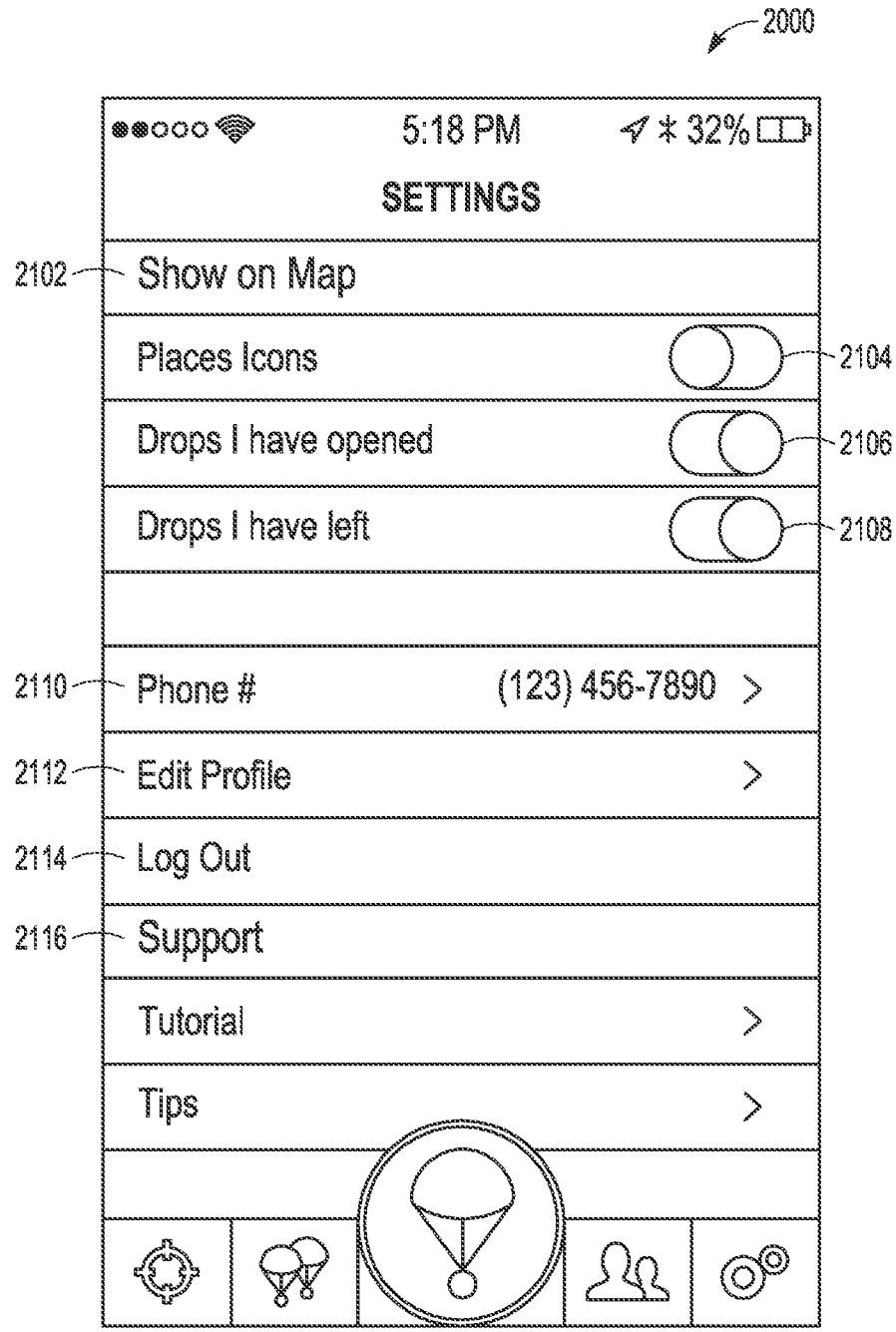
FIG. 21 illustrates aspects of a user interface for location based messaging according to certain example embodiments.

User interface 1900 of FIG. 19 then illustrates an interface providing the ability to search for other users by name or other unique identifier. The search may be input via search element 1902, and may show a list 1904 of contacts 1901 of contacts that are registered on the system so long as the user has the contact's phone number or email address saved in the user's phone contact list. In order to add contacts that are already registered with the location based messaging system, a user simply needs to select the add element 1906 next to the contact's name. From there, a push request will be sent to the selected contact that the contact has the option of either accepting or declining. For a user's phone contacts that are not on the system, the user has the option of inviting phone contacts to join the system using invite element 1910 from a list of contacts 1908.

User interface 2000 then illustrates one embodiment of an interface that may be presented once a phone contact has been invited to join the system. In such an embodiment, the user will be directed to user interface 2000 where an auto-generated message 2002 and invitation to join the system can be sent to contact 2004.

Certain embodiments may additionally include a setting interface. Setting interface 2100 of FIG. 21 includes messaging module configurations to enable users to modify account information on the settings tab. As part of setting interface 2100, a user can change the user's profile as well as customize the map display using places icon selection 2104, received communications display selection 2106, and sent communications display 2108 as part of map customization 2102. In certain embodiments, in addition to choosing hidden messages that are only received once a recipient enters the stipulated delivery radius of a given location, users may also selecting settings to toggle between leaving location-specific content on a recipient's map that appears irrespective of the recipient's location. In such embodiments, in the event the sender leaves the message on this visible basis, the sender can choose between showing the full message and marker or simply showing the marker without message to encourage the recipient to move to the location in order to view the content.

Thus, one embodiment may be a method for location based communications comprising receiving, at a input device of a first mobile device, a first recipient selection input identifying a second mobile device, where the first mobile device is different than the second mobile device and the second mobile device is associated with a first identifier value. Such a method may involve receiving, at the input device of the first mobile device, a first content message associated with the first recipient selection input; receiving, at the input device of the first mobile device, a first geofence input associated with the first content message, wherein the first geofence input identifies a first delivery area; and initiating communication of the first content message from the first mobile device to the second mobile device via a network, wherein the first content message is configured for presentation on the second mobile device when the second mobile device is within the first delivery area.

Additional implementations of such an embodiment may operate where the first identifier is a mobile telephone number or where the first identifier is an e-mail address.

Further implementations of such an embodiment may operate where initiating communication of the first content message from the first mobile device to the second mobile device comprises communicating a single message service (SMS) text message to the second mobile device, wherein the SMS text message indicates the availability of the first content message in the first delivery area.

Further implementations of such an embodiment may operate where receiving, at the input device of the first mobile device, the first geofence input associated with the first content message comprises: displaying a map interface on a touch screen of the first mobile device; receiving a location selection via the touch screen displaying the map interface, the location selection identifying a point within the first delivery area; receiving a delivery radius input on the touch screen displaying the map interface, wherein the delivery radius defines, at least in part, a boundary of the first delivery area; and displaying a visual indicator of the location selection and the delivery radius on the touch screen display.

Further implementations of such an embodiment may include receiving at the first mobile device, a first visible message setting prior to initiating communication of the first content message; receiving, at the second mobile device, a notification identifying the point within the first delivery area and the boundary of the first delivery area; displaying, at the second mobile device, in response to the first visible message setting and a determination that the second mobile device is outside the first delivery area, a second map interface comprising a first delivery area representation without displaying the first content message; determining by the second mobile device that the second mobile device has moved within the first delivery area; and displaying the first content message in response to the determining that the second mobile device has moved within the first delivery area.

Further implementations of such an embodiment may operate by receiving, at the input device of the first mobile device, an expiration input identifying an expiration time period; wherein the expiration input is received at the first mobile device prior to a beginning of the expiration time period, and wherein the second map interface comprising the first delivery area representation is only displayed by the second mobile device during the expiration time period.

Further implementations of such an embodiment may operate where receiving, at the input device of the first mobile device, the first geofence input associated with the first content message comprises: receiving a location search input; displaying a list of locations in response to the location search input; and receiving a location selection input selecting a first location associated with the first delivery area from the list of location.

Further implementations of such an embodiment may operate where receiving, at the input device of the first mobile device, the first geofence input associated with the first content message comprises: displaying, in response to the first recipient selection input, a list of saved profile locations associated with the first identifier value; and receiving a location selection input selecting a first location associated with the first delivery area from the list of saved profile locations.

Further implementations of such an embodiment may operate by receiving, at the input device of the first mobile device, a second geofence input associated with the first content message, the second geofence input comprising a first sender area; and determining that the first mobile device is within the first sender area; wherein initiating communication of the first content message from the first mobile device to the second mobile device is performed in response to the determining that the first mobile device is within the first sender area.

Further implementations of such an embodiment may operate by, prior to receipt of the first recipient selection input at the first mobile device: receiving, at a cloud server computer from the second mobile device, a first registration communication, wherein the first user registration communication comprises the first identifier value; receiving, at the cloud server computer from the first mobile device, a first add contact request; communicating, from the cloud server computer to the second mobile device, an add contact request associated with the first mobile device; receiving, at the cloud server computer from the second mobile device, a first add contact acceptance; and communicating, from the cloud server computer to the second mobile device, an add contact acceptance associated with the second mobile device.

Another embodiment may be a mobile device for location based communications. Such a mobile device may include a user input module configured to: receive a first recipient selection input identifying a second mobile device, wherein the first mobile device is different than the second mobile device and the second mobile device is associated with a first identifier value; receive a first content message associated with the first recipient selection input; and receive a first geofence input associated with the first content message, wherein the first geofence input identifies a first delivery area. Such a mobile device may also include a messaging module communicatively coupled to the user input module, wherein the messaging module is configured with at least one processor and a memory of the mobile device, and the messaging module is configured to: access the first identifier value in response to the first recipient selection input; generate a location based message from the first identifier value, the first content message, and the first geofence input; and initiate communication of the first content message as part of the location based message from the first mobile device to the second mobile device via a network, wherein the first content message is configured for presentation on the second mobile device when the second mobile device is within the first delivery area.

Further implementations of such an embodiment may include an antenna coupled to the at least one processor, with the antenna configured to communicate the location based message via the network; and a location manager module configured with the at least one processor and the memory, wherein the positioning module is configured to receive position communications and determine a position of the mobile device.

Further implementations of such an embodiment may include an output display coupled to the processor and the memory, where the messaging module is further configured to: receive a notification via the antenna and the network that a second message associated with a second delivery area has been directed to the first mobile device by a second mobile device; determine when the mobile device is within the second delivery area; and initiate display of the second message on the output display in response to determination that the mobile device is within the second delivery area.

Another embodiment may be a non-transitory computer readable medium comprising computer readable instructions that, when executed by at least on processor of a mobile device, cause the mobile device to: receive, at a input device of a mobile device, a first recipient selection input identifying a second mobile device, wherein the mobile device is different than the second mobile device and the second mobile device is associated with a first identifier value; receive, at the input device, a first content message associated with the first recipient selection input; receive, at the input device, a first geofence input associated with the first content message, wherein the first geofence input identifies a first delivery area; initiate communication of the first content message from the mobile device to the second mobile device via a network, wherein the first content message is configured for presentation on the second mobile device when the second mobile device is within the first delivery area.

Additional implementations of such an embodiment may operate where the instructions further cause the mobile device to: send a registration communication to a cloud server computer; receive a second location based message from a third mobile device via the could server computer; in response to a first visible message setting of the second location based message, store the second location based message without generating a user notification to notify a user of the mobile device of the second location based message; determine a second delivery area associated with the second location based message; determine a current location of the mobile device; and generate and output a second location based message notification in response to a determination that the current location of the mobile device is within the second delivery area.

FIG. 22 is then a block diagram illustrating an example computer system machine 2200 upon which any one or more of the methodologies herein discussed can be run. Computer system machine 2200 or elements of computer system machine 2200 can be embodied as a mobile device 110, 115, or 120, or any other computing platform or element described or referred to herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 2200 includes a processor 2202 (e.g., a central processing unit (CPU), a graphics processing unit (GPU) or both), a main memory 2204 and a static memory 2206, which communicate with each other via an interconnect 2208 (e.g., a link, a bus, etc.). The computer system machine 2200 can further include a video display unit 2210, an alphanumeric input device 2212 (e.g., a keyboard), and a user interface (UI) navigation device 2214 (e.g., a mouse). In one embodiment, the video display unit 2210, input device 2212 and UI navigation device 2214 are a touch screen display. The computer system machine 2200 can additionally include a storage device 2216 (e.g., a drive unit), a signal generation device 2218 (e.g., a speaker), an output controller 2232, a power management controller 2234, and a network interface device 2220 (which can include or operably communicate with one or more antennas 2230, transceivers, or other wireless communications hardware), and one or more sensors 2228, such as a Global Positioning Sensor (GPS) sensor, compass, location sensor, accelerometer, or other sensor.

The storage device 2216 includes a machine-readable medium 2222 on which is stored one or more sets of data structures and instructions 2224 (e.g., software) embodying or utilized by any one or more of the methodologies or functions described herein. The instructions 2224 can also reside, completely or at least partially, within the main memory 2204, static memory 2206, and/or within the processor 2202 during execution thereof by the computer system machine 2200, with the main memory 2204, static memory 2206, and the processor 2202 also constituting machine-readable media.

While the machine-readable medium 2222 is illustrated in an example embodiment to be a single medium, the term "machine-readable medium" can include a single medium or multiple media (e.g., a centralized or distributed database, and/or associated caches and servers) that store the one or more instructions 2224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

The instructions 2224 can further be transmitted or received over a communications network 2226 using a transmission medium via the network interface device 2220 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Although embodiments have been described with reference to specific implementations, it will be evident that various modifications and changes may be made to these embodiments without departing from the broader spirit and scope of the embodiments described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

We claim:

1. A location based method for communication, the method comprising:

receiving, at an input device of a first mobile device, a first recipient selection input identifying a second mobile device, wherein the first mobile device is different than the second mobile device and the second mobile device is associated with a first identifier value;

receiving, at the input device of the first mobile device, a first content message associated with the first recipient selection input;

receiving, at the input device of the first mobile device, a first geofence input associated with the first content message, wherein the first geofence input identifies a first delivery area; and initiating communication of the first content message from the first mobile device to the second mobile device via a network, wherein the first content message is configured for presentation on the second mobile device when the second mobile device is within the first delivery area; and prior to receipt of the first recipient selection input at the first mobile device:

receiving, at a cloud server computer from the second mobile device, a first registration communication, wherein the first user registration communication comprises the first identifier value;

receiving, at the cloud server computer from the first mobile device, a first add contact request;

communicating, from the cloud server computer to the second mobile device, an add contact request associated with the first mobile device;

receiving, at the cloud server computer from the second mobile device, a first add contact acceptance; and communicating, from the cloud server computer to the second mobile device, an add contact acceptance associated with the second mobile device.

2. The method of claim 1 further comprising:
receiving, at a cloud server computer from the first mobile device, a location based message comprising the first identifier value, the first content message, and the first delivery area; and notifying the second mobile device, using a push message, of the location based message.

3. The method of claim 2 further comprising:
receiving, at the second mobile device, the push message; and synchronizing, by the second mobile device, an unfound message list with the cloud server computer to receive the location based message from the cloud server computer.

4. The method of claim 3 further comprising:
measuring, by the second mobile device, a location change of the second mobile device;

determining, based on the measuring of the location change, that the second device is within the first delivery area;

adding the first content message to a local found list; and outputting a found notification using an output of the second mobile device to notify a second device user of the first content message.

5. The method of claim 4 further comprising:
updating, by the cloud server computer, a first content message status associated with the location based message in response to the determining that the second device is within the first delivery area.

6. The method of claim 1 wherein the first identifier is a mobile telephone number.

7. The method of claim 1 wherein the first identifier is an e-mail address.

8. The method of claim 1 wherein initiating communication of the first content message from the first mobile device to the second mobile device comprises communicating a single message service (SMS) text message to the second mobile device, wherein the SMS text message indicates the availability of the first content message in the first delivery area.

9. The method of claim 1 wherein receiving, at the input device of the first mobile device, the first geofence input associated with the first content message comprises:
displaying a map interface on a touch screen of the first mobile device;

receiving a location selection via the touch screen displaying the map interface, the location selection identifying a point within the first delivery area;

receiving a delivery radius input on the touch screen displaying the map interface, wherein the delivery radius defines, at least in part, a boundary of the first delivery area; and displaying a visual indicator of the location selection and the delivery radius on the touch screen display.

10. The method of claim 9 further comprising:
receiving at the first mobile device, a first visible message setting prior to initiating communication of the first content message;

receiving, at the second mobile device, a notification identifying the point within the first delivery area and the boundary of the first delivery area;

displaying, at the second mobile device, in response to the first visible message setting and a determination that the second mobile device is outside the first delivery area, a second map interface comprising a first delivery area representation without displaying the first content message;

determining by the second mobile device that the second mobile device has moved within the first delivery area;

communicating a receipt notification from the second mobile device to the first mobile device in response to the determining that the second mobile device has moved within the first delivery area; and displaying the first content message in response to the determining that the second mobile device has moved within the first delivery area.

11. The method of claim 10 further comprising:
receiving, at the input device of the first mobile device, an expiration input identifying an expiration time period;

wherein the expiration input is received at the first mobile device prior to a beginning of the expiration time period, and wherein the second map interface comprising the first delivery area representation is only displayed by the second mobile device during the expiration time period.

12. The method of claim 1 wherein receiving, at the input device of the first mobile device, the first geofence input associated with the first content message comprises:
receiving a location search input;

displaying a list of locations in response to the location search input; and receiving a location selection input selecting a first location associated with the first delivery area from the list of location.

13. The method of claim 1 wherein receiving, at the input device of the first mobile device, the first geofence input associated with the first content message comprises:
displaying, in response to the first recipient selection input, a list of saved profile locations associated with the first identifier value; and receiving a location selection input selecting a first location associated with the first delivery area from the list of saved profile locations.

14. The method of claim 1 further comprising:
receiving, at the input device of the first mobile device, a second geofence input associated with the first content message, the second geofence input comprising a first sender area; and determining that the first mobile device is within the first sender area;

wherein initiating communication of the first content message from the first mobile device to the second mobile device is performed in response to the determining that the first mobile device is within the first sender area.

15. A mobile device for location based communications, the mobile device comprising:
a user input module configured to:
receive a first recipient selection input identifying a second mobile device, wherein the first mobile device is different than the second mobile device and the second mobile device is associated with a first identifier value;
receive a first content message associated with the first recipient selection input; and
receive a first geofence input associated with the first content message, wherein the first geofence input identifies a first delivery area;
a messaging module communicatively coupled to the user input module, wherein the messaging module is configured with at least one processor and a memory of the mobile device, and the messaging module is configured to:
access the first identifier value in response to the first recipient selection input; and
generate a location based message from the first identifier value, the first content message, and the first geofence input; and
initiate communication of the first content message as part of the location based message from the first mobile device to the second mobile device via a network, wherein the first content message is configured for presentation on the second mobile device when the second mobile device is within the first delivery area; and
prior to receipt of the first recipient selection input at the first mobile device:
receive, from the second mobile device, a first registration communication, wherein the first user registration communication comprises the first identifier value;
receiving, from the first mobile device, a first add contact request;
communicate, to the second mobile device, an add contact request associated with the first mobile device;
receive, from the second mobile device, a first add contact acceptance; and
communicate, to the second mobile device, an add contact acceptance associated with the second mobile device.

16. The mobile device of claim 15 further comprising:
an antenna coupled to the at least one processor, the antenna configured to communicate the location based message via the network; and
a location manager module configured with the at least one processor and the memory, wherein the positioning module is configured to receive position communications and determine a position of the mobile device.

17. The mobile device of claim 16 further comprising an output display coupled to the processor and the memory;
wherein the messaging module is further configured to:
receive a notification via the antenna and the network that a second message associated with a second delivery area has been directed to the first mobile device by a second mobile device;
determine when the mobile device is within the second delivery area; and
initiate display of the second message on the output display in response to determination that the mobile device is within the second delivery area.

18. A non-transitory computer readable medium comprising computer readable instructions that, when executed by at least on processor of a mobile device, cause the mobile device to:
receive, at a input device of a mobile device, a first recipient selection input identifying a second mobile device, wherein the mobile device is different than the second mobile device and the second mobile device is associated with a first identifier value;
receive, at the input device, a first content message associated with the first recipient selection input;
receive, at the input device, a first geofence input associated with the first content message, wherein the first geofence input identifies a first delivery area;
initiate communication of the first content message from the mobile device to the second mobile device via a network, wherein the first content message is configured for presentation on the second mobile device when the second mobile device is within the first delivery area; and
prior to receipt of the first recipient selection input at the mobile device:
receiving from the second mobile device, a first registration communication, wherein the first user registration communication comprises the first identifier value;
receiving from the mobile device, a first add contact request;
communicating to the second mobile device, an add contact request associated with the mobile device;
receiving, from the second mobile device, a first add contact acceptance; and
communicating, to the second mobile device, an add contact acceptance associated with the second mobile device.

19. The non-transitory computer readable medium of claim 18 wherein the instructions further cause the mobile device to:
send a registration communication to a cloud server computer;
receive a second location based message from a third mobile device via the could server computer;
in response to a first visible message setting of the second location based message, store the second location based message without generating a user notification to notify a user of the mobile device of the second location based message;
determine a second delivery area associated with the second location based message;
determine a current location of the mobile device;
generate and output a second location based message notification in response to a determination that the current location of the mobile device is within the second delivery area.

* * * * *